United States Patent
Kusumoto

(12) 
(10) Patent No.: US 6,351,315 B2
(45) Date of Patent: *Feb. 26, 2002

(54) IMAGE FORMING APPARATUS CAPABLE OF CONTINUOUS OPERATION AFTER MALFUNCTION CORRECTION

(75) Inventor: Keiji Kusumoto, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,875

(22) Filed: Jul. 21, 1998

(30) Foreign Application Priority Data

Jul. 22, 1997 (JP) ............................................. 9-195332

(51) Int. Cl.⁷ ............................................... B41B 19/00
(52) U.S. Cl. ....................... 358/1.14; 358/1.15; 358/437
(58) Field of Search ............................... 358/1.14, 1.15, 358/437, 1.9

(56) References Cited

U.S. PATENT DOCUMENTS 5,032,903 A * 7/1991 Suzuki et al. .................. 358/75
5,828,864 A * 10/1998 Danknick et al. ........... 395/500
5,832,190 A * 11/1998 Tarajima et al. ............. 395/113

FOREIGN PATENT DOCUMENTS

| JP | 4-306059 | 10/1992 | ............. H04N/1/04 |
| JP | 6-350760 | 12/1994 | ............. H04N/1/00 |
| JP | 7-175916 | 7/1995 | ............. H04N/1/21 |
| JP | 9-050354 | 2/1997 | ............. H04N/1/21 |

* cited by examiner

Primary Examiner—David Moore
Assistant Examiner—Kevin C Kianni
(74) Attorney, Agent, or Firm—Sidley Austin Brown & Wood

(57) ABSTRACT

The image data are transmitted to an external device connected to the network in conjunction with a paper jam, predetermined paper supply condition such as a paper empty condition, or other abnormal condition. In this way jobs are not erased unbeknownst to an operator when power is automatically shut OFF due to lack of operation for a predetermined time following a print operation stoppage, or when power is shut OFF in conjunction with the correction of a paper jam or other abnormal condition. When the cause of the image data transmission has been corrected or when power is restored to the digital copier, the image data previously transmitted to an external device on the network are returned to the digital copier. In this way printing can be easily restarted by executing a restart continuous operation process without requiring an operator to again input image data in order to restart printing.

29 Claims, 23 Drawing Sheets

MT1

| REGION | PAGE NUMBER PN | FRONT LINK | BACK LINK | ADDITIONAL INFORMATION |
|---|---|---|---|---|
| 00 | 1 | 00 | 01 | |
| 01 | 1 | 01 | FF | |
| 02 | 2 | 00 | 03 | |
| 03 | 2 | 03 | FF | |
| ⋮ | | | | |

MEMORY READING OPERATION

IMAGE FORMING APPARATUS CAPABLE OF CONTINUOUS OPERATION AFTER MALFUNCTION CORRECTION

This application is based on Application No. HEI 9-195332 filed in Japan, the content of which is hereby incorporated by reference.

BACKGROUND OF THE INVENTION

1. Field of the Invention

The present invention relates to an image forming apparatus such as a digital copier, facsimile, printer, and combinations thereof, and specifically relates to an image forming apparatus connected to an external device such as another image forming apparatus, computer or the like via a communications network.

2. Description of the Related Art

In recent years image forming apparatuses have appeared which are capable of continuously and sequentially printing image data stored in installed memory having relatively large capacity. Such image forming apparatuses are advantageous in reducing the overall processing time and increasing operation efficiency of the apparatus because a plurality of jobs stored in memory can be consecutively processed.

Specifically, in the digital copier provided with an image reader disclosed in Japanese Laid-Open Patent Application NO. HEI 4-306059, an operator can start a reading operation regardless of an on-going printing operation so as to reduce the waiting time in front of the copier by independently controlling the printing operation for stored image data as well as the reading operation of a plurality of documents.

This type of image forming apparatus reduces the waiting time of an operator, and operators frequently leave the apparatus.

In conventional image forming apparatuses, a printing operation is temporarily stopped when the paper cassette being used becomes depleted, when a paper jam occurs in the transport path, and when other abnormalities occurs such as the fixing heater is shut off, inadequate charging and the like.

From the perspective of recent international environmental regulations, it has become standard to provide a function to turn OFF the power supply automatically when a predetermined time has elapsed after the apparatus has stopped.

As described above, in image forming apparatuses provided with memory, an image is held in memory while the apparatus is stopped when an abnormality occurs such as depletion of the paper in a cassette. At this time, the operator is frequently absent from the apparatus for the previously described reasons, and when the apparatus has remained in this state for a predetermined time, the automatic power cut off function is activated. Normally, conventional image forming apparatuses are not provided with backup power supplies to achieve a more compact form factor for the apparatus and reduce the cost of the power supply and the like, such that the stored image data are erased when the power supply is turned OFF, and, disadvantageously, the image must be input again performing an image reading operation when power is restored.

The power supply is also shut OFF for safety reasons when correcting abnormalities such as clearing a paper jam and the like when the apparatus has stopped due to an abnormality as previously described. In such instances, image data stored in memory are erased causing a similar disadvantage.

SUMMARY OF THE INVENTION

An object of the present invention is to eliminate the previously described disadvantages by providing an image forming apparatus capable of executing continuous printing operations automatically without special procedures when the stopped state of the apparatus is released.

One aspect of the present invention is to provide, in an image forming apparatus, a memory means for storing input image data, image forming means for forming an image on a recording medium based on said stored image data, communication means for transmitting and receiving image data to/from an external device, detection means for detecting trouble relating to said recording medium, and a control means to transmit said image data to said external device via said communications means when trouble is detected by said detection means and to receive transmitted image data via said communications means after said trouble has been cleared.

Another aspect of the present invention is to provide, in an image forming apparatus, a memory means for storing input image data, image forming means for forming an image on a recording medium based on said stored image data, communication means for transmitting and receiving image data to/from an external device, power source condition detection means for detecting the ON/OFF condition of the power source, detection means for detecting trouble relating to said recording medium, and a control means to transmit said image data to said external device via said communications means when trouble is detected by said detection means and to receive transmitted image data via said communications means when a change in the power source from an OFF condition to an ON condition is detected by said power source condition detection means.

A further aspect of the present invention is to provide, in an image forming apparatus, a memory means for storing input image data, image forming means for forming an image by operating a plurality of image forming elements, communication means for transmitting and receiving image data to/from an external device, detection means for detecting trouble relating to at least one among said plurality of image forming elements, and a control means to transmit said image data to said external device via said communications means when trouble is detected by said detection means and to receive transmitted image data via said communications means after said trouble has been cleared.

Another aspect of the present invention is to provide, in an image forming apparatus, a memory means for storing input image data, communication means for transmitting and receiving image data to/from an external device, power source condition detection means for detecting the ON/OFF condition of a power source, detection means for detecting trouble relating to said apparatus, and a control means to transmit said image data to said external device via said communications means when trouble is detected by said detection means and to receive transmitted image data via said communications means when a change in the power source from an OFF condition to an ON condition is detected by said power source condition detection means.

Embodiments of the aforesaid aspects include, in the transmission of said image data to an external device, determination of the presence/absence of a communications-enabled external device, and determination of whether or not the available memory storage capacity can receive the amount of transmitted image data. Unnecessary transmission and reception are therefore avoided.

Embodiments of the aforesaid aspects further include, transmission of image data when there has been a lack of operation a predetermined time after detection of trouble. The disadvantage of erasure of image data is therefore avoided even when the power source has been turned OFF due to a lack of operation for a predetermined time.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description. like parts are designated by like reference numbers throughout the several drawings.

DESCRIPTION OF THE PREFERRED EMBODIMENTS

Figure 1:
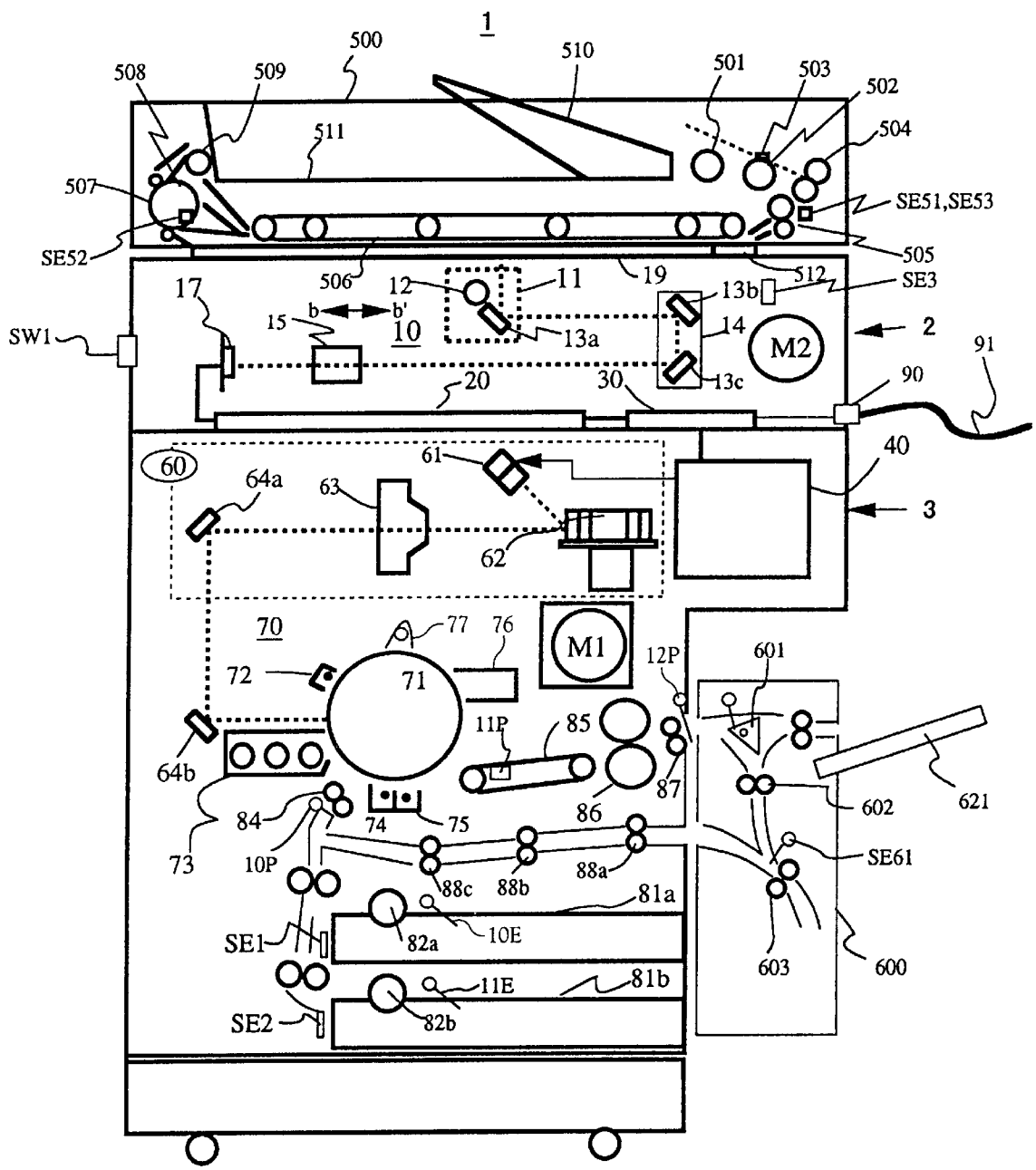
FIG. 1 is a section view showing the general construction of a digital copier of an embodiment of the present invention.

FIG. 1 shows the general construction of a digital copier of an embodiment of the present invention. In FIG. 1, copier 1 comprises a scanning unit 10 for reading a document and converting the read data to image signals, image signal processing unit 20 for processing the image signals transmitted from scanning unit 10, memory unit 30 for storing image signals processed by image signal processing unit 20 and outputting image signals to the print processor 40, print processor 40 for driving semiconductor laser 61 based on image signals transmitted from memory unit 30, laser optical unit 60 for directing the laser beam emitted from semiconductor laser 61 to the photosensitive member 71, image forming unit 70 for developing the latent image formed on photosensitive member 71 via the exposure of the laser beam and transferring and fixing said developed image on a paper sheet, the previously mentioned operation panel 800, automatic document feeder 500 for feeding a document onto the document table one sheet at a time and inverting said document front-to-back as necessary, and sheet recirculating unit 600 for recirculating an inverted sheet.

Reading unit 2 comprises the aforesaid scanning unit 10 and image signal processing unit 20, and the printer unit 3 comprises the aforesaid print processor 40, laser optical unit 60, and image forming unit 70. Switch SW1 is used to supply power from the power source to the digital copier 1.

Reading unit 2 reads a document placed on document table 19, and generates image data corresponding to each pixel of the document image. A first scanner 11 provided with an exposure lamp 12 and first mirror 13a, and a second scanner 14 provided with second and third mirrors 13b and 13c move in the arrow b and b' directions (sub-scan direction) via a scanning motor M2. At this time, the light emitted by exposure lamp 12 is reflected by a document placed on document table 19, and the reflected light is directed to line sensor 17 via mirrors 13a, 13b, and 13c. Line sensor 17 is provided with a plurality of photoelectric conversion elements arrayed perpendicular to the paper surface (main scan direction), and outputs in line units the image data corresponding to each pixel at a resolution of, for example, 400 dots-per-inch (dpi), based on the reflected light of the document, thereby producing image data of one document sheet via the sub-scan by first and second scanners 11 and 14. A home position sensor SE3 detects the first scanner 11 at the home position.

Image data output from line sensor 17 is transmitted to memory unit 30 after processing by image signal processing unit 20. Memory unit 30 compresses and temporarily stores the received image data, and expands and transmits the stored image data to print processor 40. Editing processes such as image inversion and the like are executed as necessary at this time. Memory unit 30 is also provided with an external device interface described later, so as to allow connection to an external device via external device connector 90 and peripheral cable 91.

Printer unit 3 is described hereinafter. Print processor 40 controls the laser optical unit 60 based on the image data received from memory unit 30. Laser optical unit 60 is provided with a semiconductor laser 61 for emitting a laser beam modulated (ON/OFF) by print processor 40, polygonal mirror 62 for scanning the laser beam emitted by semiconductor laser 61 on the surface of photosensitive drum 47, fθ lens 63, and mirrors 64a and 64b.

Arranged around the periphery of rotatable photosensitive drum 71 in the direction of drum rotation are charger 72, developing device 73, transfer charger 74, separation charger 75, cleaner 76, and eraser lamp 77; a toner image is formed by a well known electrophotographic process, and transferred onto a paper sheet. On the other hand, a paper sheet is fed from cassette 81a or 81b via take-up roller 82a or 82b, and transported to the position of charger 74 via feed rollers 83a, 83b, and timing roller 84. The copy sheet bearing a toner image transferred by transfer charger 74 is transported to the recirculation unit 600 via transport belt 85, fixing device 86, and discharge roller 87. Each of the aforesaid rollers and photosensitive drum 71 are driven by a main motor M1.

In the vicinity of cassettes 81a and 81b are provided paper size sensors SE1 and SE2 for detecting the size of the sheets accommodates in each cassette, and out-of-paper sensors 10E and 11E for detecting the presence/absence of paper accommodated in each cassette (i.e., whether or not the cassette is empty).

Paper sensors are provided in the paper feed path for detecting the transport state and timing of the sheet, so as to detect abnormalities in the paper path such as a paper jam and the like via the detection of the state of said paper sensors. In FIG. 1, paper sensor 10P is provided anteriorly to the timing roller 84, sensor 11P is provided near transport belt 85, and sensor 12P is provided posteriorly to discharge roller 87. The paper jam detection method itself is well known and is, therefore, not described in detail. Although the present embodiment employs an example of three paper sensors, it is to be understood that the present invention is not limited to this number inasmuch as the number of sensors provided may be increased or decreased in accordance with the desired degree of precision of said detection.

Automatic document feeder 500 is described hereinafter. Automatic document feeder 500 automatically feeds a document placed in document tray 510 one sheet at a time onto document table 19, and ejects a document scanned by scanning unit 10 to document discharge tray 511.

Specifically, a document comprising a single sheet or a plurality of sheets are placed in document feed tray 510 with the reading surface facing upward with the position of said document adjusted by a side regulating panel, and when operation starts, the bottom-most document of the stack is fed sequentially via feed roller 501. At this time, the document is managed by auxiliary roller 502 and pad 503 and transported one sheet at a time by intermediate roller 504, and the document transport timing is detected by registration sensor SE51 and the document width is detected by document size sensor SE53, and thereafter skewing of the document is corrected by registration roller 505.

The document is transported by transport belt 506, and directly after the trailing edge of the document passes the document scale 512, the transport belt 506 reverses direction slightly and stops. This action abuts the trailing edge of the document against the endface of document scale 512 and accurately stops the document at position on document table 19. At this time, the next document is transported to registration roller 505 to reduce the transport time of said next document.

A document on the document table 19 is scanned by scanning unit 10, and subsequently transported to the left in the drawing via transport belt 506, the transport direction is changed by inversion roller 507, and thereafter the document passes above switching hook 508 and is ejected to discharge tray 511 via discharge roller 509.

In the case of duplex documents, a document which has been scanned on a first side is again placed at the reading position on document table 19 by changing the transport direction via inversion roller 507, and switching the switching hook 508. After the image of the second side of the document has been scanned, the document is ejected to discharge tray 511 as previously described.

The recirculation unit 600 is described hereinafter. When duplex copying has been specified, recirculation unit 600 temporarily accommodates a copy sheet ejected by discharge roller 87, and again feeds the sheet into the printing unit 3 via a switchback, whereas in single side copying the copy sheet is ejected to discharge tray 621 as previously described.

In the case of duplex copying, a copy sheet ejected from discharge roller 87 is switched in transport direction by switching hook 601, and transported via transport roller 602 to forward/reverse roller 603. Thereafter, when the trailing edge of the copy sheet is detected by sheet sensor SE61, forward/reverse roller 603 reverse rotates and the copy sheet is returned into the printer unit 3. The returned copy sheet is transported to timing roller 84 via transport rollers 88a, 88b, and 88c, and enters a standby state for transfer of the image on the second side. When a plurality of copy sheets are continuously fed, each sheet is transported to the recirculation unit 600 consecutively at predetermined intervals to prevent overall of the sheets. Accordingly, since the copy sheet transport path is constant, the number of copy sheets which can be accommodated in the circulation path formed by the recirculation unit 600 and the main transport path is dependent on the size of the copy sheets. A copy sheet jam is detected when the trailing edge or leading edge of a copy sheet is not detected for a specified time based on the detection result of sheet sensor SE61.

Figure 2:
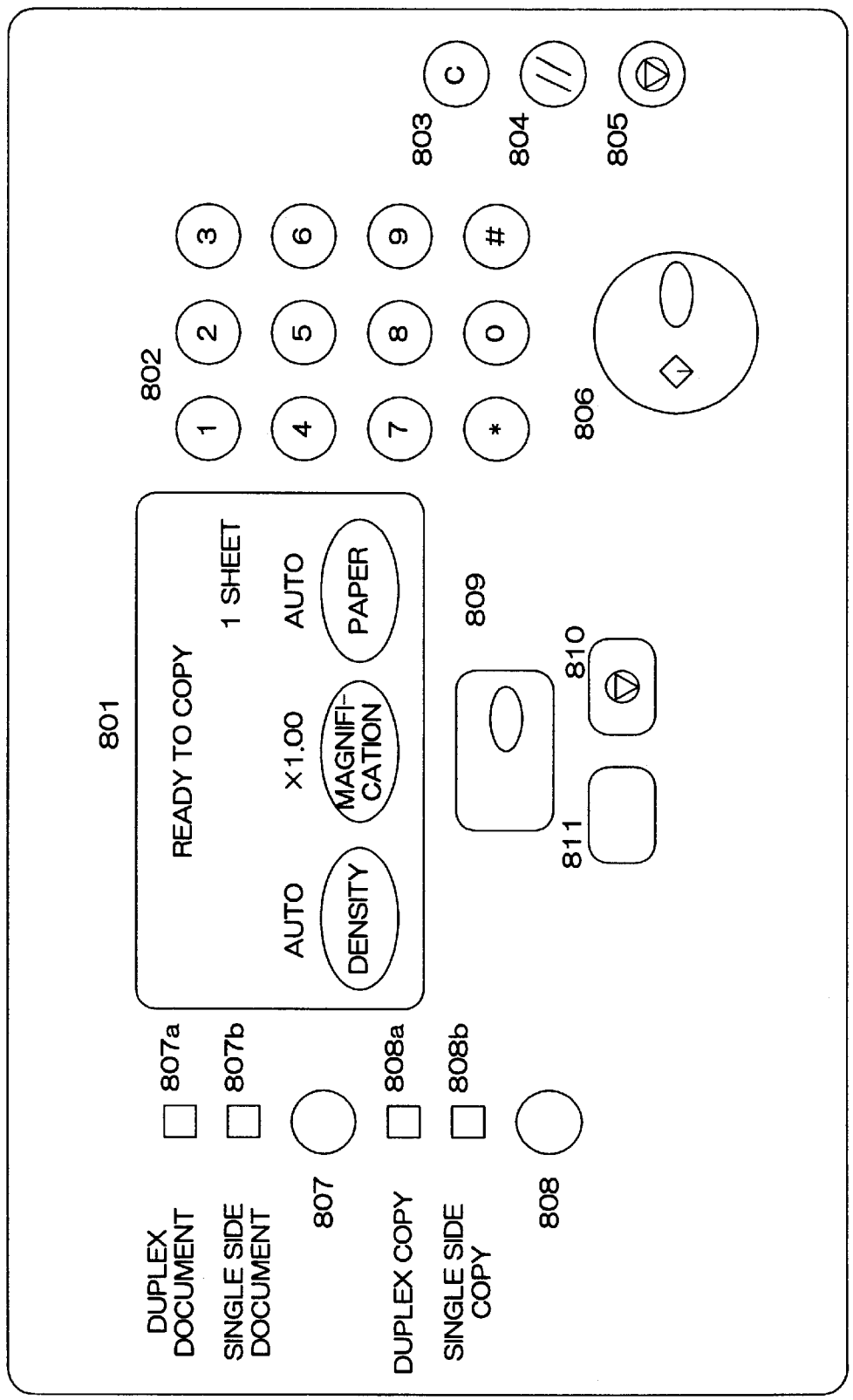
FIG. 2 shows the operation panel of the digital copier of FIG. 1.

FIG. 2 shows operation panel 800 of the digital copier of FIG. 1. Operation panel 800 is provided with a liquid crystal touch panel 801 for setting modes and displaying various conditions, ten key pad 802 for entering numerical conditions such as number of copies and magnification, clear key 803 for returning numerical conditions to default values, panel reset key 804 for copy mode initialization, stop key 805 for specifying the interruption of a copy operation, start key 806 for specifying the start of a copy operation, document specification key 807 for specifying single side document or duplex document, light-emitting diodes LED 807a and 807b for displaying the document type specified by the document specification key, copy mode selection key 808 for selecting single side copies or duplex copies, LED 808a and 808b for displaying the selected copy mode, scan start key 809 for starting scanning of a next document during printing of a document, scan stop key 810 for interrupting scanning of a document, and record key 811 for recording a single scanned page or plurality of scanned pages of a document to memory as one job.

Liquid crystal touch panel 801 displays various displays such as an out-of-paper display indicating the absence of copy sheets in the various cassettes, a paper jam display indicating a copy sheet jam, and a trouble display warning of an abnormal condition such as inadequate motor drive, shut off heater and the like.

The digital copier 1 of the present embodiment temporarily stores scanned image data in memory, and reads out and prints image data from memory. Accordingly, when scanning of a first document batch has been completed, it is possible to scan a next document batch even during printing of a first job (document batch), and it is possible to store a plurality of complete jobs in memory. In this instance, scanning of a next document batch is started by pressing the scan start key 809, and after scanning setting the copy mode and pressing the record key 811 to record the scanned data as a job.

Jobs stored in memory unit 30 are not limited to the previously described scanned documents inasmuch as image data may be transmitted from an external device such as a computer or the like. In this instance, image data of one sheet or a plurality of sheets are automatically recorded as a single job without operating the record key 811.

Figure 3:
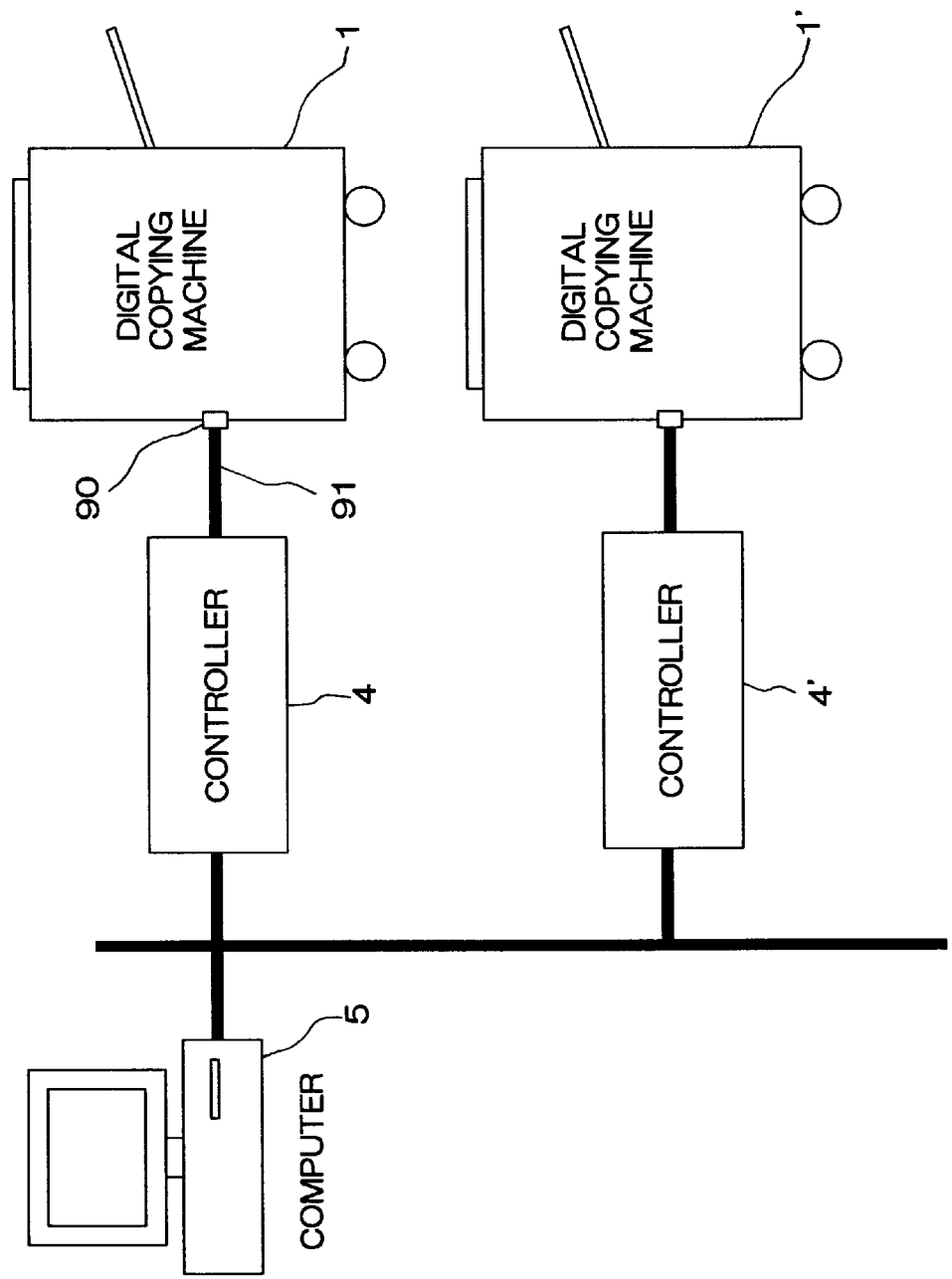
FIG. 3 illustrates an example of a system connecting the digital copier of FIG. 1 and an external devices via a network circuit.

FIG. 3 illustrates an example of a system connecting the digital copier 1 of FIG. 1 and external an device via a network circuit. Digital copier 1 is provided with an external device connector 90 linked to a single controller 4, i.e., an external device, via an interface cable 91. Controller 4 is a universal interface such as Ethernet or the like, connected to a digital copier 1' provided with functions similar to digital copier 1 via controller 4' and a computer 5 or the like.

Operation of this system, for example, transmits data generated by computer 5 to controller 4 based on print requests from computer 5. Data such as postscript data or the like transmitted from computer 5 are converted to raster data by controller 4. The converted raster data are stored in memory (minimum capacity of one page) in controller 4, and transmitted to digital copier 1. In digital copier 1, the received image data are temporarily stored in memory unit 30, and printing starts if there is not a currently executing printing job, whereas said image data are held in standby condition as a recorded job if a printing job is currently executing, and printing starts after completion of the printing of the prior job. Image data scanned by digital copier 1 may be transmitted to computer 5 or digital copier 1', and conversely, transmitted image data may be returned to digital copier 1.

The construction of the system is not limited to the previously described system inasmuch as network printers, and image reading apparatuses may be connected as other connected devices. Furthermore, the system may employ facsimile machines and the like connected via modems and public telephone lines.

Figure 4:
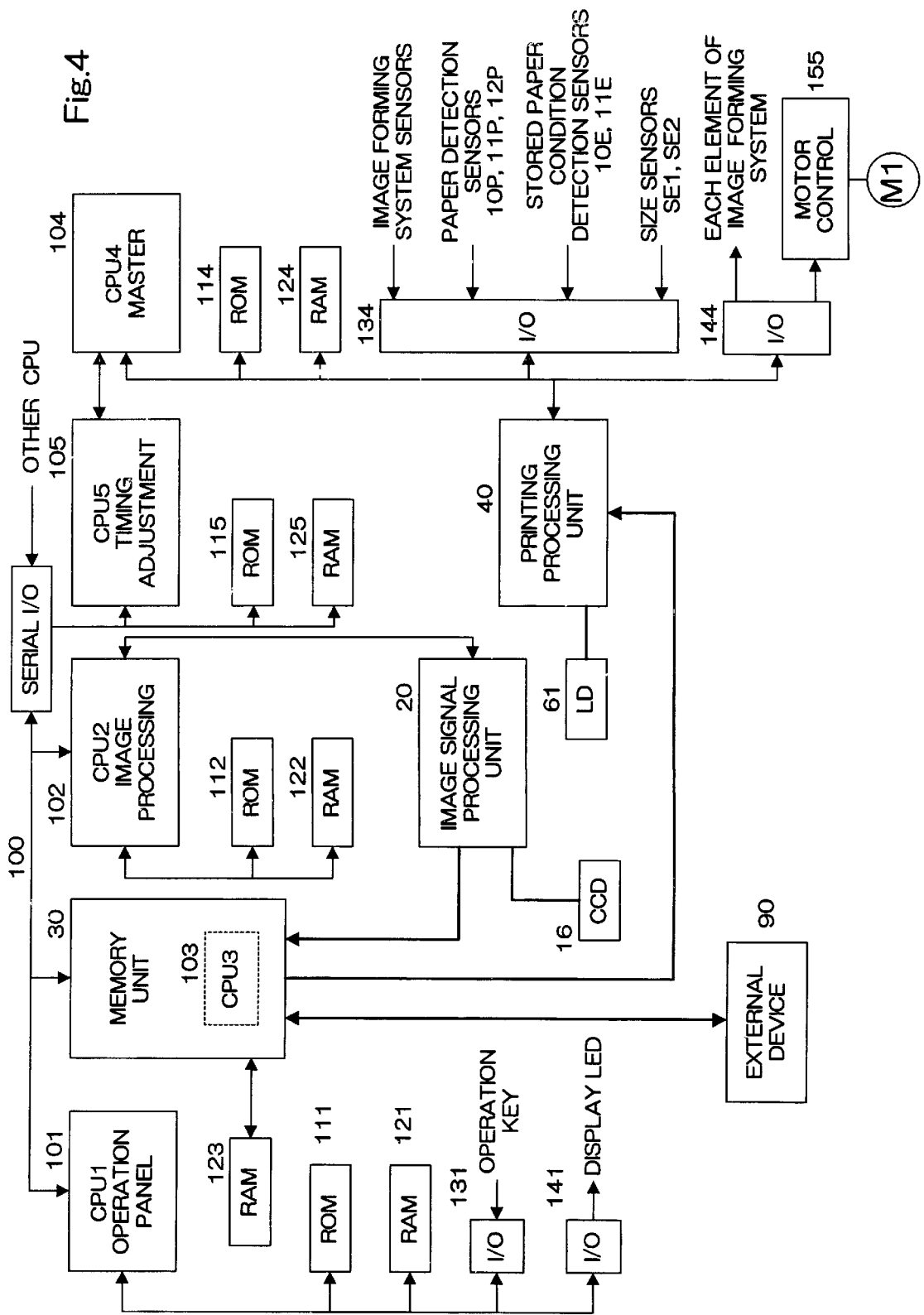
FIG. 4 is a circuit block diagram showing the general construction of the control unit of the digital copier of FIG. 1.
Figure 5:
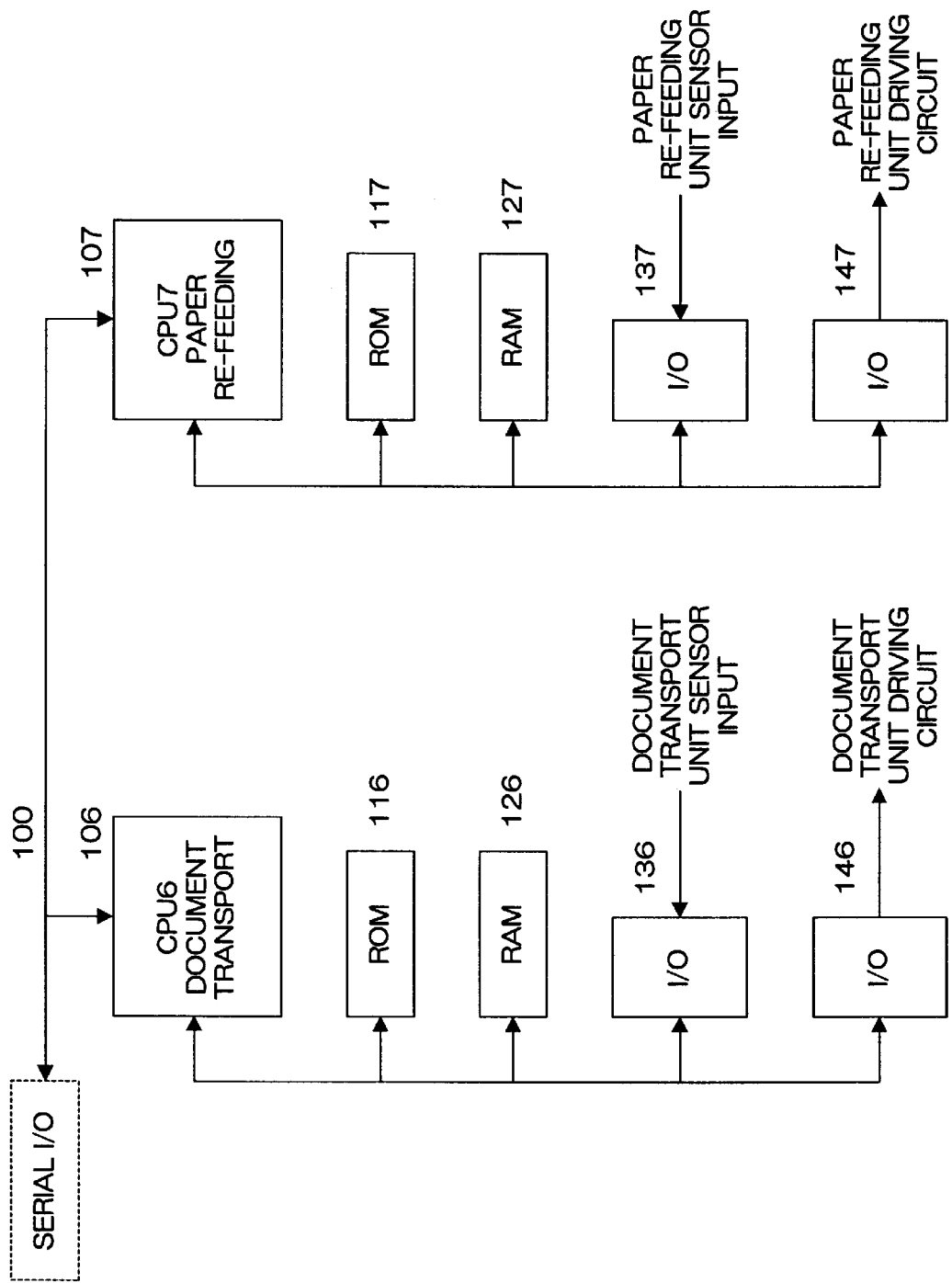
FIG. 5 is a circuit block diagram showing the general construction of the control unit of the digital copier of FIG. 1.

FIGS. 4 and 5 are circuit block diagrams showing the construction of control unit 100 of digital copier 1. Control unit 100 mainly comprises seven separate central processing units (CPU), which provide general control while transmitting and receiving information between CPUs via serial I/O. CPU 1~7 (101~107) are provided with read only memories ROM 111~117 for storing various programs, and random access memories RAM 121~127 used as work areas for execution of the aforesaid programs.

CPU 1 (101) controls the operation panel 800, and receives input of signals from the various keys through I/O 131, and outputs display data for the various displays through I/O 141.

CPU 2 (102) controls various image processing executed by image signal processing unit 20, and controls the drive of the scanning unit 10, and the lighting of exposure lamp 12.

CPU 3 (103) is provided within memory unit 30, and stores image data received from image signal processing unit 20 in image memory 304 (described later with reference to FIG. 7), and reads out and transmits said data from memory to print processor 40. CPU 3 (103) further transmits and receives image data and control data to/from external devices via the external device connector 90 connected to memory unit 30.

CPU 4 (104) controls print processor 40, laser optical unit 60, and image forming unit 70. Specifically, CPU 4 (104) controls ON/OFF modulation of the semiconductor laser 61 based on received image data in print processor 40. CPU 4 (104) controls rotation of the polygonal mirror 62 in laser optical unit 60. CPU 4 (104) controls the operation of various aspects of image formation based on various input information in image forming unit 70. The drive of main motor M1 and motor controller 155 are further controlled by signals from this CPU through I/O 144.

CPU 4 (104) manages the various conditions of the printer unit 3. Specifically, manages copy sheet size via detection data received from copy size sensors SE1 and SE2 via I/O 134. Similarly, out-of-paper status is managed via detection data from out-of-paper sensors 10E and 11E. This CPU also manages paper jam conditions at the various sensor positions via detection data from paper sensors 10P, 11P, and 12P.

CPU 5 (105) manages various data timing adjustment among the various CPUs, and operation mode settings.

CPU 6 (106) controls automatic document feeder 500 by managing detection data of various sensors provided in the transport document path via I/O 136, and controlling the drive circuit for document transport through I/O 146.

CPU 7 (107) controls recirculation unit 600, by managing detection data from various sensors placed in the recirculation path through I/O 137, and controlling the drive of various transport rollers to recirculate a sheet through I/O 147.

Essential details of the control block are described below with reference to FIGS. 6~9. This block has reference numbers in common with FIG. 4.

Figure 6:
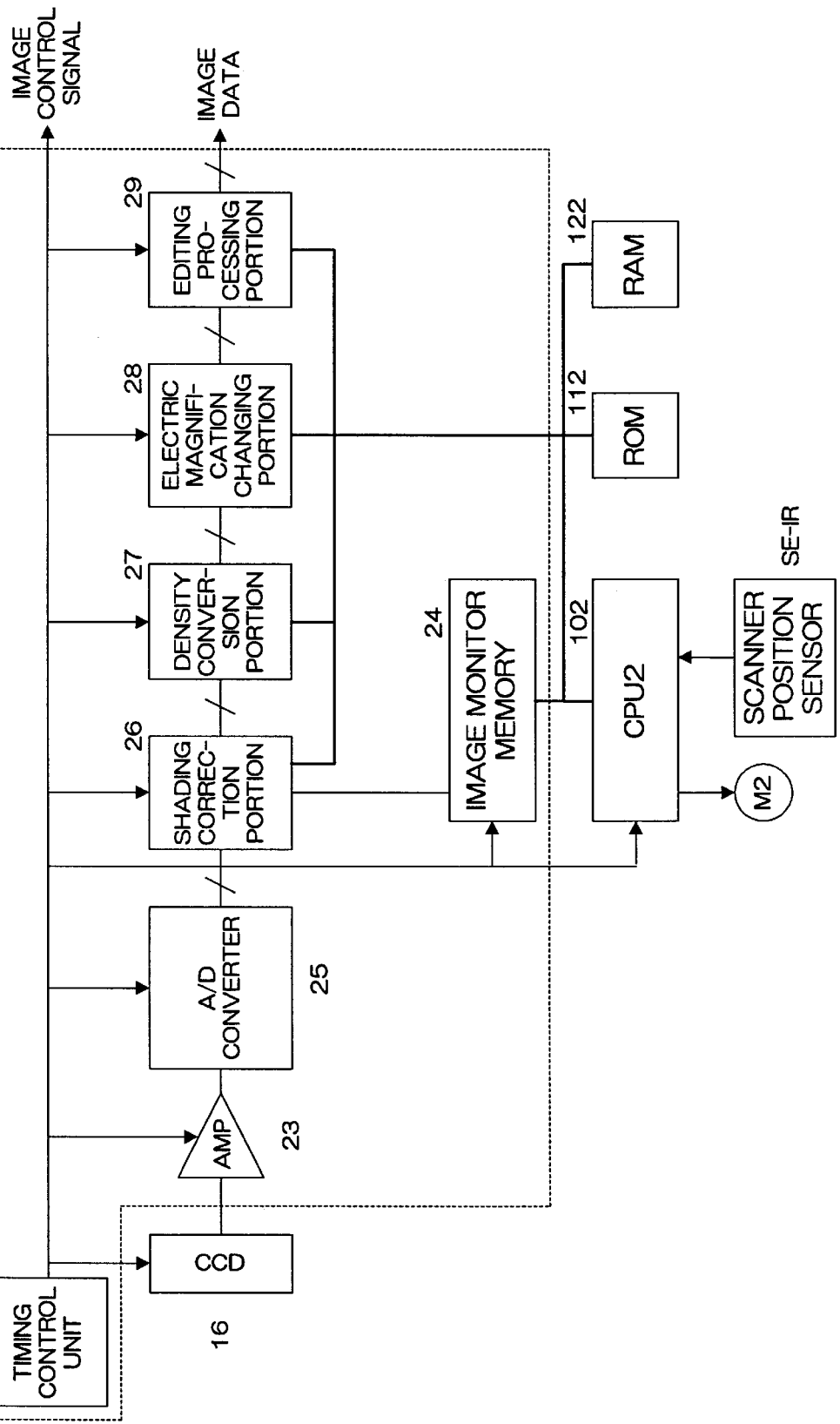
FIG. 6 is a control block diagram of reading unit 2 and image signal processing unit 20.

FIG. 6 is a control block diagram of reading unit 2 and image signal processing unit 20. First, an image reading synchronization signal is supplied to each block by timing control unit 21. Charge-coupled device (CCD) 16 photo-electrically converts the reflected light of a document via photoelectric conversion elements within line sensor 17 (refer to FIG. 1), and generates electric signals based on document information. The generated signals are amplified by AMP unit 23, and converted to 8-bit digital signals by analog-to-digital (A/D) converter 25. Thereafter, the converted signals are processed to eliminate distortion caused by the optical system and the CCD.

The corrected signals are subjected to processing to correct gradient characteristics by converting the reflection data to density data in density converter 27. Thereafter, the data are subjected to electrical variable magnification processing in the main scan direction from magnification information set by the electrical magnification unit 28. The processed signals are then subjected to an image editing process by editing unit 29, and transmitted as image data to print processor 40 and memory unit 30.

Image monitor memory 24 stores 1 line segments of image data specified by CPU 2 (102). The stored data are used as reference data in a shading correction process by the shading correction unit.

CPU 2 executes general control of the reading unit 2 such as setting parameters for image processing blocks 26~29, scan control for driving scanning motor M2, and communications with CPU 5 (105).

Document size and document direction detection operations are controlled by CPU 2 (102). Determination as to whether or not a read image is a document is accomplished using, for example, the difference in reflected light between a document and a document cover when a document cover is reflected in a mirror. Prescan controls are executed when CPU 2 (102, receives a document size detection request from CPU 5 (105). At this time, CPU 2 (102) monitors scanner position information from scanner position sensor SEIR, and moves scanner 11 in the sub-scan direction to detect the document size and placement direction from the read image data and monitor position information; this information is then transmitted to CPU 5 (105).

When reading a document, CPU 2 (102) controls the actuation of scanning motor M2 at a speed based on the set magnification information received from CPU 5 (105).

Figure 7:
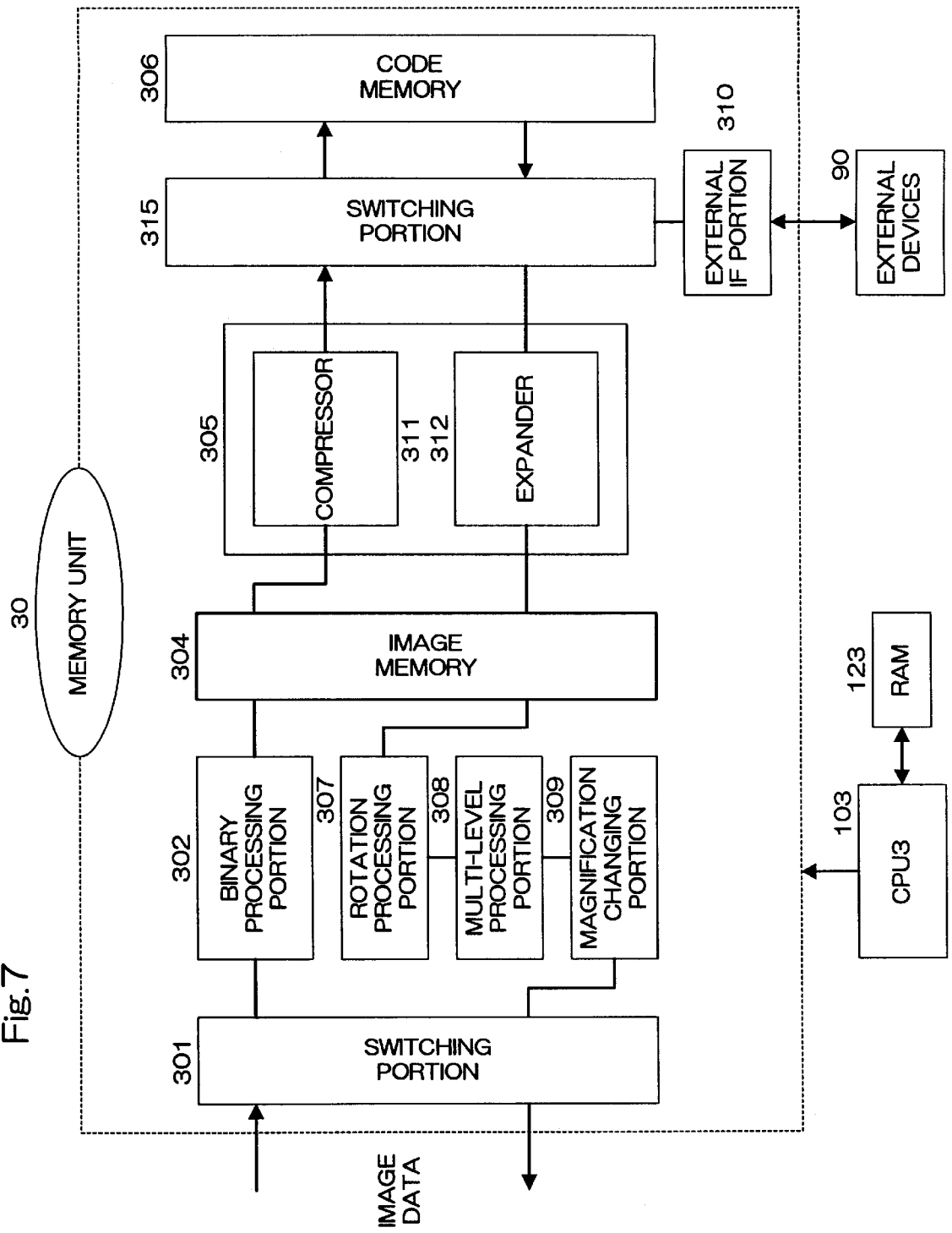
FIG. 7 is a control block diagram of the memory unit 30.

FIG. 7 is a control block diagram for memory unit 30. Memory unit 30 comprises a switching unit 301 for switching image data input/output, binarization unit 302 for generating binary data based on parameters set by CPU 3 (103), multiport image memory 304 having a capacity of two A4-size pages at a resolution of 400 dpi, encoder 305 provided with a compressor 311 and expander 312 capable of operating independently, code memory 306 for storing compressed code data, external interface IF 310 for transmitting and receiving data with an external device connected to external device connector 90, switching unit 315 for switching the image data route between code memory 306 and external IF 310, rotation processing unit 307 for executing rotation processing of image data, multi-level converter 308 for generating multi-level data based on parameter settings received from CPU 3 (103), variable magnification unit 309 for accomplishing electrical variable magnification, and CPU 3 (103) for controlling the aforesaid general aspects of memory unit 30.

Switching unit 315 is constructed so as to be capable of transmitting and receiving signals with an external device via external IF 310, and processes transmitting and returning image data characteristics of the present invention is executed via this part of CPU 3 (103). Management of information for the previously described controls is executed in external IF 310 by CPU 3 (103).

When image data are recorded in image memory 304, encoder 305 reads out and compresses said image data as code data and transmits the code data to code memory 306. Code data are readout from code memory 306 and expanded via instruction from CPU 3 (103), and recorded in image memory 304. Compressor 311 and expander 312 operate in parallel and with mutual independence. Data are transmitted between encoder 305 and code memory 306 via direct memory access (DMA).

When expanded image data are expanded into 1-page segments in image memory 304, image data are transmitted to rotation processing unit 307 via instructions from CPU 3 (103), and the image is rotated as necessary. Then, image data are converted to multi-level data from binary data by multi-level processor 308, subjected to electrical variable magnification in the main scan direction and sub-scan direction by variable magnification unit 309 via parameters received from CPU 3 (103), and output.

When temporarily storing the aforesaid document image in code memory 306, the code memory 306 is managed by a management table MT1 provided within RAM 123 (refer to FIG. 4). Management table MT1 is described in detail later.

The operation of code memory 306 in the present invention when digital copier 1 is not connected to a network and the memory of an external device cannot be used is such that the full capacity state of code memory 306 is detected, and a compression complete report is added to the parameters indicating further compression is disabled is sent from CPU 3 (103) to CPU 5 (105). This process alerts CPU 5 (105) to the memory full status of code memory 306, other CPUs are alerted to the memory full status via communication with CPU 5 (105), and processing is executed based on this status. In the case of CPU 1 (101), for example, a trouble warning is displayed on the display area of operation panel 800, and in the case of CPU 2 (102), an executing reading operation is interrupted.

When digital copier 1 is connected to a network so as to allow use of the memory of an external device, e.g., in a system such as illustrated in FIG. 3, image data stored in code memory 306 are temporarily transmitted to the memory of an external device when an out-of-paper, paper jam or other abnormal state is generated in digital copier 1. Thereafter, the image data are retransmitted from the memory of the external device and printing is resumed when the trouble state is corrected by replenishing the paper supply, restarting the power source, and removing the paper jam. The returned data are stored in code memory 306 through, for example, external IF 310 and switching unit 315. These controls are executed by CPU 3 (103).

Figures 8A, 8B:
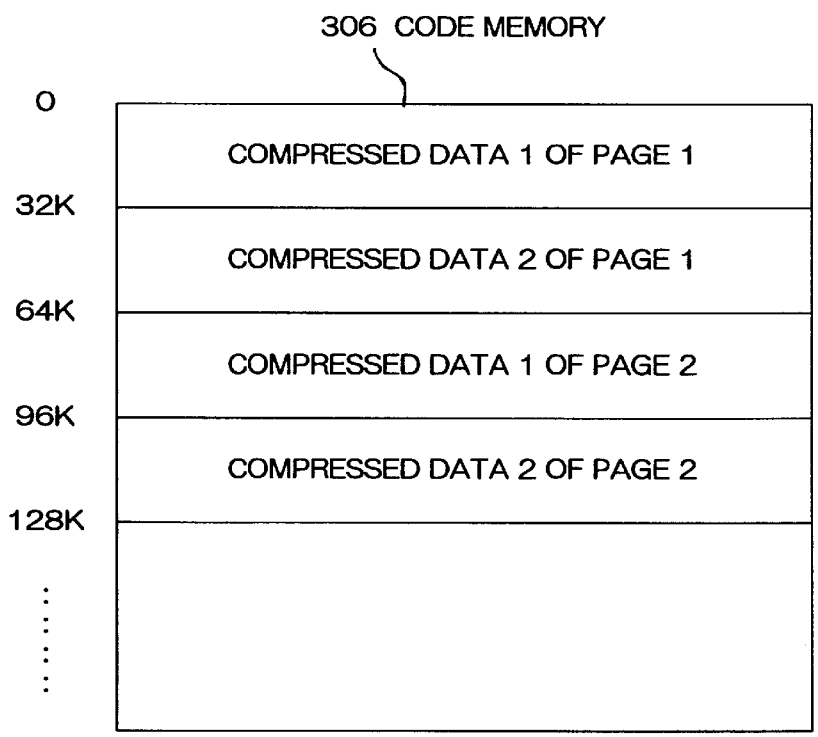
FIG. 8 illustrates the relationship between the job management table MT1 and the code memory 306.

FIGS. 8a and 8b illustrate the relationship between the previously mentioned management table MT1 and code memory 306. In consideration of simultaneous control of recording (during image reading) and readout (printing), code memory 306 is divided into memory areas of 32 kb units to store the compressed data (code data) of each page.

Management table MT1 stores numbers indicating the area of code memory 306, page number PN attached document units in recorded sequence (document reading sequence), linking information previous and subsequent memory areas, and appended information, and dynamically manages code memory 306 based on said information. Appended information includes information required for the compression and expansion processes such as compression method and data length and the like, job record number for managing a document (images) of a single page or a plurality of consecutive pages as a single job, and operation mode information for each job such as number of pages to be printed and magnification and the like.

The column heading [front link] in management table MT1 indicates a link of each memory area in a forward direction; a front link of [00] indicates the initial area of image data of one page, and a front link other than [00] indicates an area linked to another area. The column heading [back link] similarly indicates a link of each memory area in a back direction; a back link of [FF] indicates the final area of image data of one page, and a back link other than [FF] indicates an area linked in a back direction.

When image data are readout and compressed from image memory 304, CPU 3 (103) refers to management table MT1 and controls the compressor 311 and stores the compressed data in code memory 306. When image data are output, CPU 3 (103) similarly refers to management table MT1 and controls expander 312 and reads out the image data from code memory 306.

The information management table MT1 is erased after page information has been properly read out and the number of pages set by a user have been properly printed.

Figure 9:
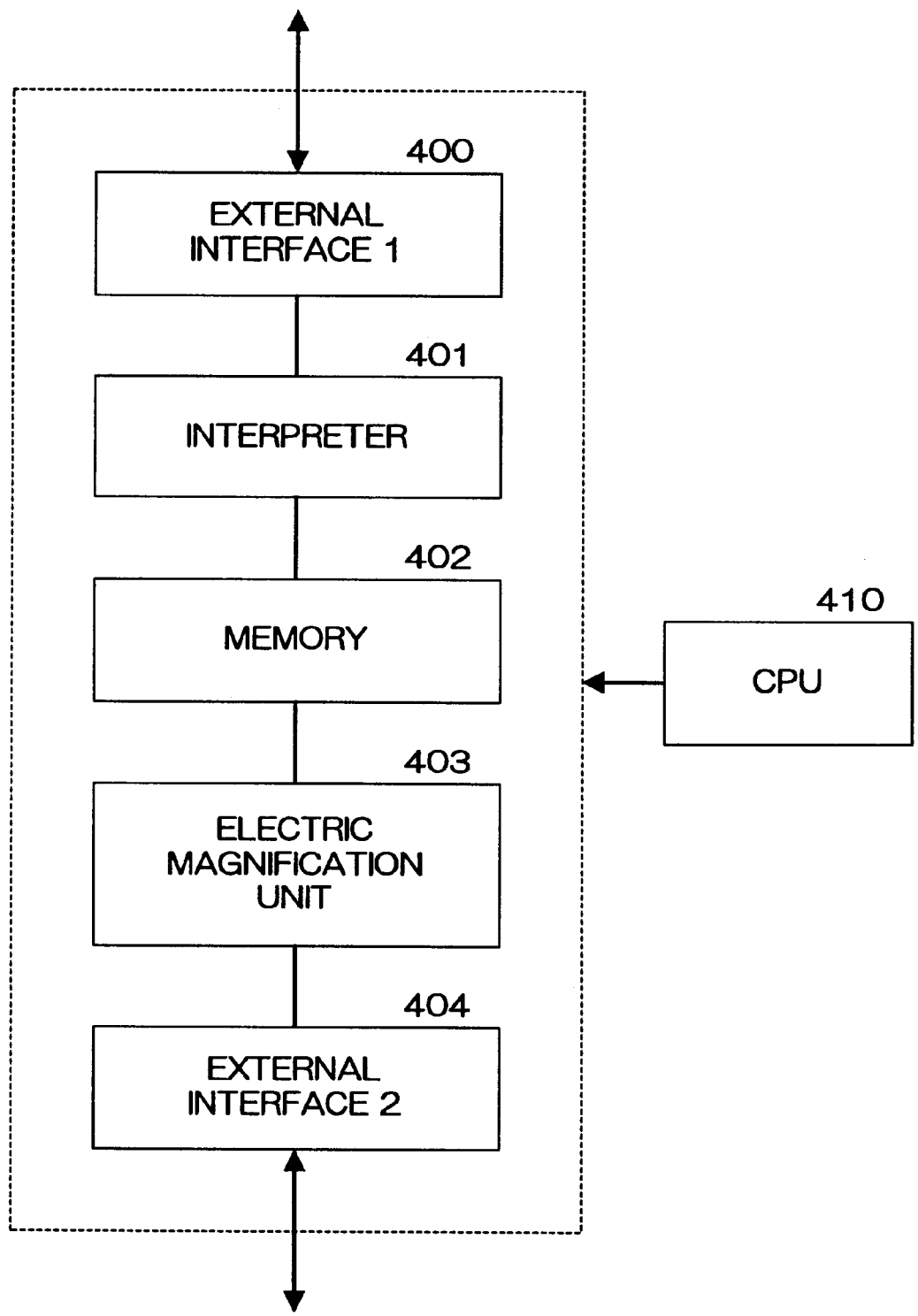
FIG. 9 is a control block diagram of the controller 4 shown in FIG. 3.

FIG. 9 is a control block diagram of controller 4 shown in FIG. 3. In the drawing, reference number 400 refers to external interface 1 for sending and receiving data to/from computer 5. Reference number 401 refers to an interpreter for translating data (e.g., postscript data) transmitted from computer 5 and expanding said data to raster data. Image data expanded to raster data are sequentially stored in memory 402. When 1 page segment image data stored in memory 402 are expanded, the image data are transmitted to digital copier 1 through electric magnification unit 403 and external interface 2 (404). At this time, electric variable magnification unit 403 controls the image data transmission speed by the electric variable magnification in the sub-scan direction (FD direction) based on magnification adjustment data (speed adjustment data) transmitted from the digital copier 1. CPU 410 executes batch control of blocks 400-404.

Controller 4 is capable of transmitting compressed image data directly from digital copier 1 to an external device or from an external device to digital copier 1 based on control data from digital copier 1 without executing a raster expansion operation on said image data.

The operation sequence of digital copier 1 is described below by focusing on the request commands (Q) and reports (A) and image data flow among the various CPUs.

Figure 10:
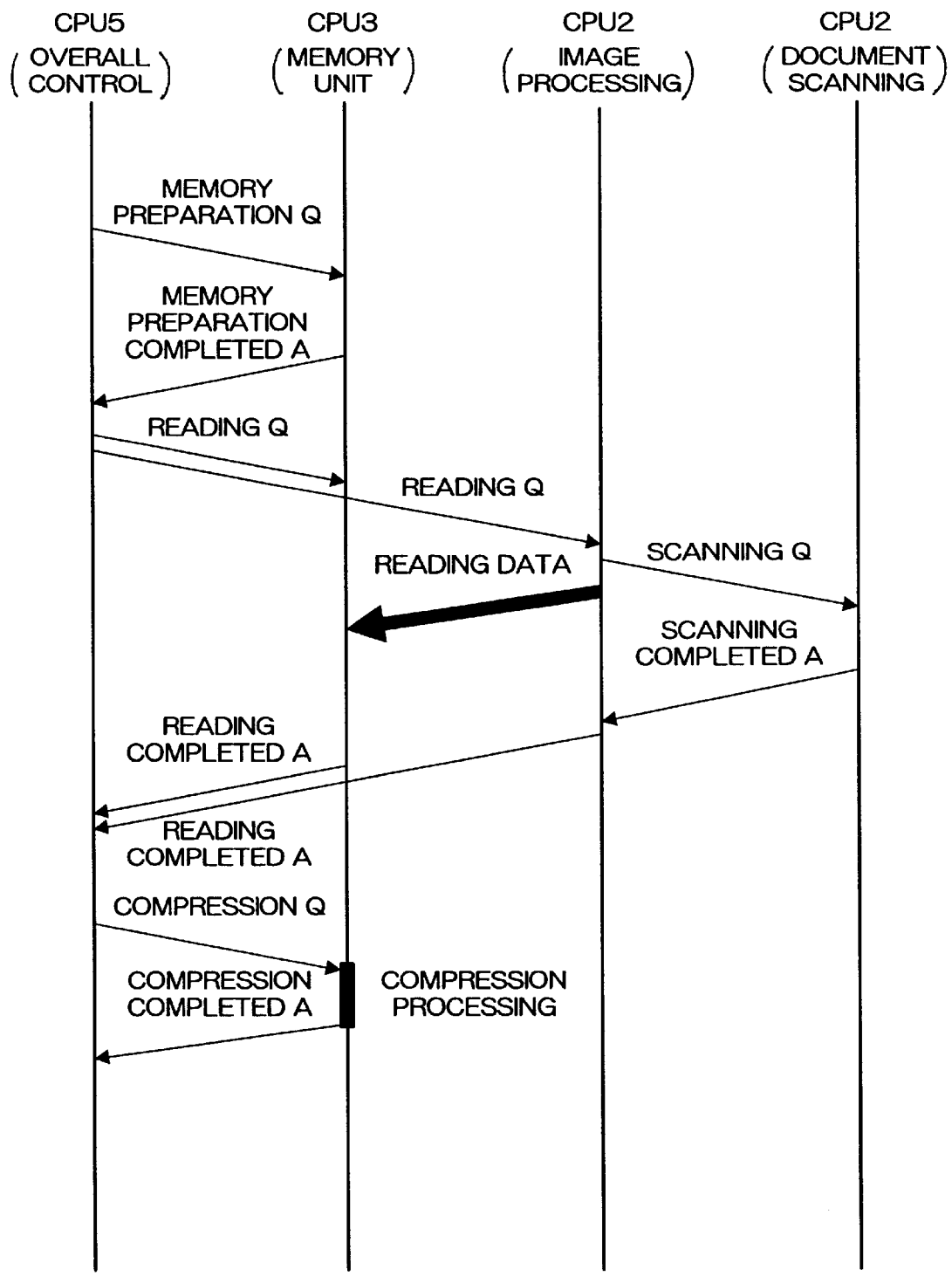
FIG. 10 briefly shows the sequence of the memory recording operation, i.e., the operation of scanning of a document and recording the read image data in memory.

FIG. 10 briefly shows the sequence of the memory recording operation, wherein a document is scanned and the read image data are stored in memory. In this operation, read image data are transmitted from image signal processing unit 20 to image memory 304 of memory unit 30.

First, CPU 5 (105) which controls the overall sequence requests memory preparation by CPU 3 (103) (memory preparation Q). CPU 3 (103) receives this request, and sets the bus connection state of the hardware within memory unit 30 for transmitting image data from image signal processing unit 20 to image memory 304, sets the mode of binarization, and sets the starting address of the recording area in image memory 304, and the XY range for encoding.

When these settings are completed, CPU 3 (103) alerts CPU 5 (105) that preparation memory unit 30 is completed (memory preparation complete A). Then, CPU 5 (105) requests that CPU 2 (102) start reading (reading Q). When this request is received, CPU 2 (102) instructs its internal document scanning controller to start scanning (scan Q). When the document scanning controller starts scanning of the document and scanner 11 arrives at the image region, the image is read in accordance with the image processing mode set by CPU 2 (102), and the read image data are transmitted from image signal processing unit 20 to memory unit 30.

When document scanning controller completes scanning (scan end A), CPU 2 (102) alerts CPU 5 (105) that reading has ended. Then, an alert indicating that reading has ended is sent from CPU 3 (103) (reading end A).

Then, CPU 5 (105) requests image data compression by CPU 3 (103) (compression Q). CPU 3 (103) receives this request, and sets the readout address in image memory 304, XY range information, recording address in code memory 306, mode for compressor 311 (e.g., arithmetic encoding method, modified Huffman (MH) method), and activates each block. In this way, image data compression processing is accomplished. When compression is completed, an alert indicating the end of compression is sent from CPU 3 (103) to CPU 5 (105) (compression end A), and the memory recording operation ends.

Figure 11:
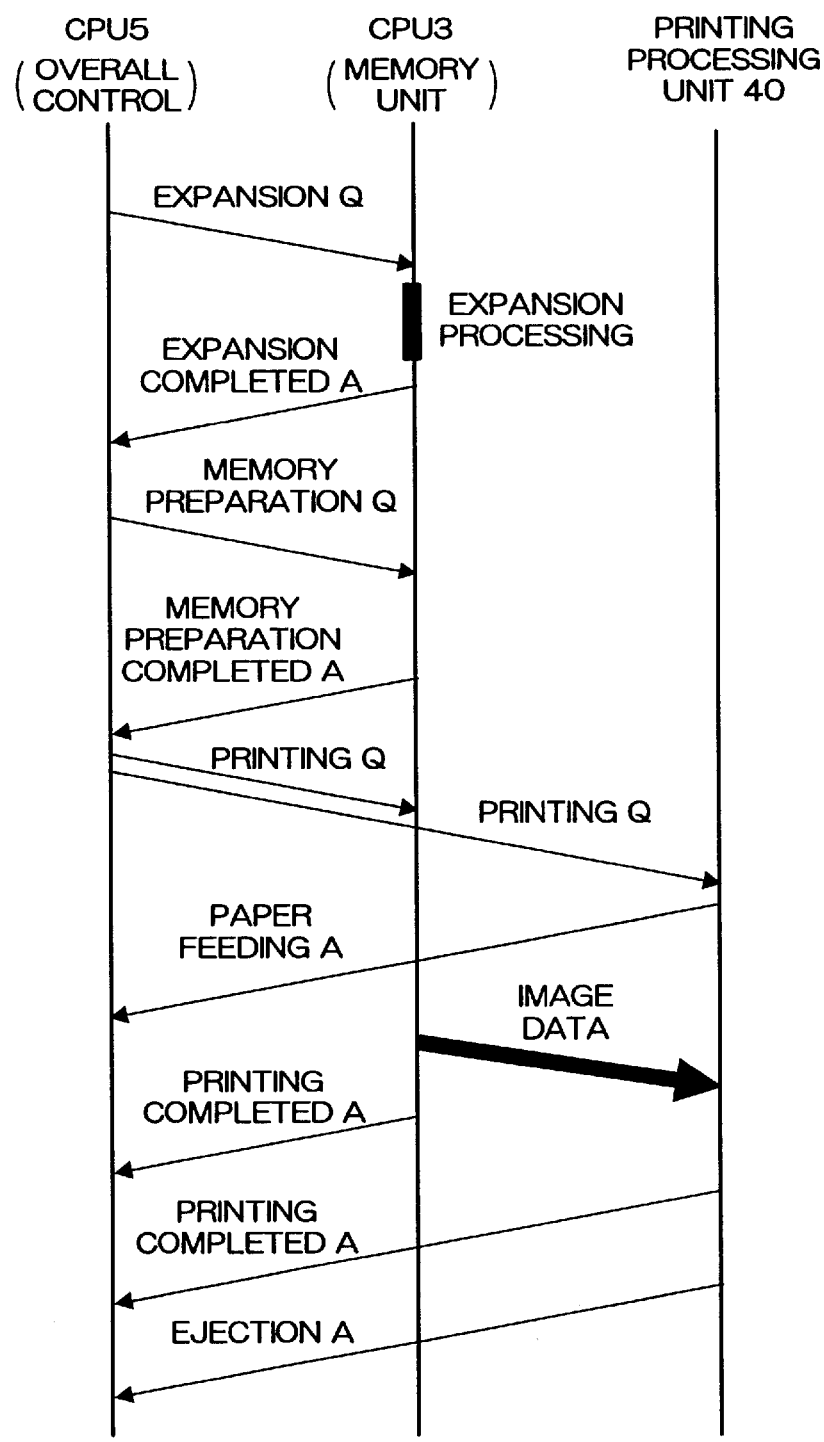
FIG. 11 briefly shows the sequence of the memory reading operation, i.e., the operation of reading image data from memory and printing said read image data on a paper sheet.

FIG. 11 briefly shows the sequence of the memory reading operation, i.e., reading image data from memory and printing the read image data on a copy sheet. In this operation, the code data stored in code memory 306 is read out by the aforesaid memory recording operation, and transmitted as expanded image data to the print processor 40 for printing.

CPU 5 (105) requests code data expansion from CPU 3 (103) (expansion Q). This request is received by CPU 3 (103), which sets the readout address in code memory 305, data quantity, XY range information, record address in image memory 304, and mode of expander 312 (e.g., arithmetic encoding method, modified Huffman (MH) method), and activates each block. In this way the code data expansion process is accomplished and image data are stored in image memory 306. When the expansion process ends, an alert indicating that expansion is completed is sent from CPU 3 (103) to CPU 5 (105) (expansion end A).

When the expansion process ends, CPU 5 (105) sends a memory preparation request to CPU 3 (103) to read out image data from image memory 304 (memory preparation Q). CPU 3 (103 receives this request, and sets the bus connection state in hardware within the memory unit 30 for transmission of image data from image memory 304 to print processor 40, sets parameters for the rotation process, and sets the start address of the readout area in image memory 304.

When these settings are completed, CPU 3 (103) alerts CPU 5 (105, that the preparation of memory unit 30 is completed (memory preparation end A). Then, CPU 5 (105) requests CPU 3 (103) to start printing by print processor 40 (print Q). CPU 3 (103) receives this request, and print processor 40 transmits a paper supply report indicating the copy paper condition to CPU 5 (105) (paper supply A), and subsequently image data read out from image memory 304 are transmitted to print processor 40 and printed.

When printing is completed, CPU 3 (103) and print processor 40 transmit print end reports to CPU 5 (105) (print end Q), and print processor 40 transmits an eject end report (eject A). CPU 5 (105) receives these reports, and sends a memory clear request to CPU 3 (103) as necessary.

The operation controls of the present embodiment are described below with reference to the flow charts of FIGS. 12~22.

Figure 12:
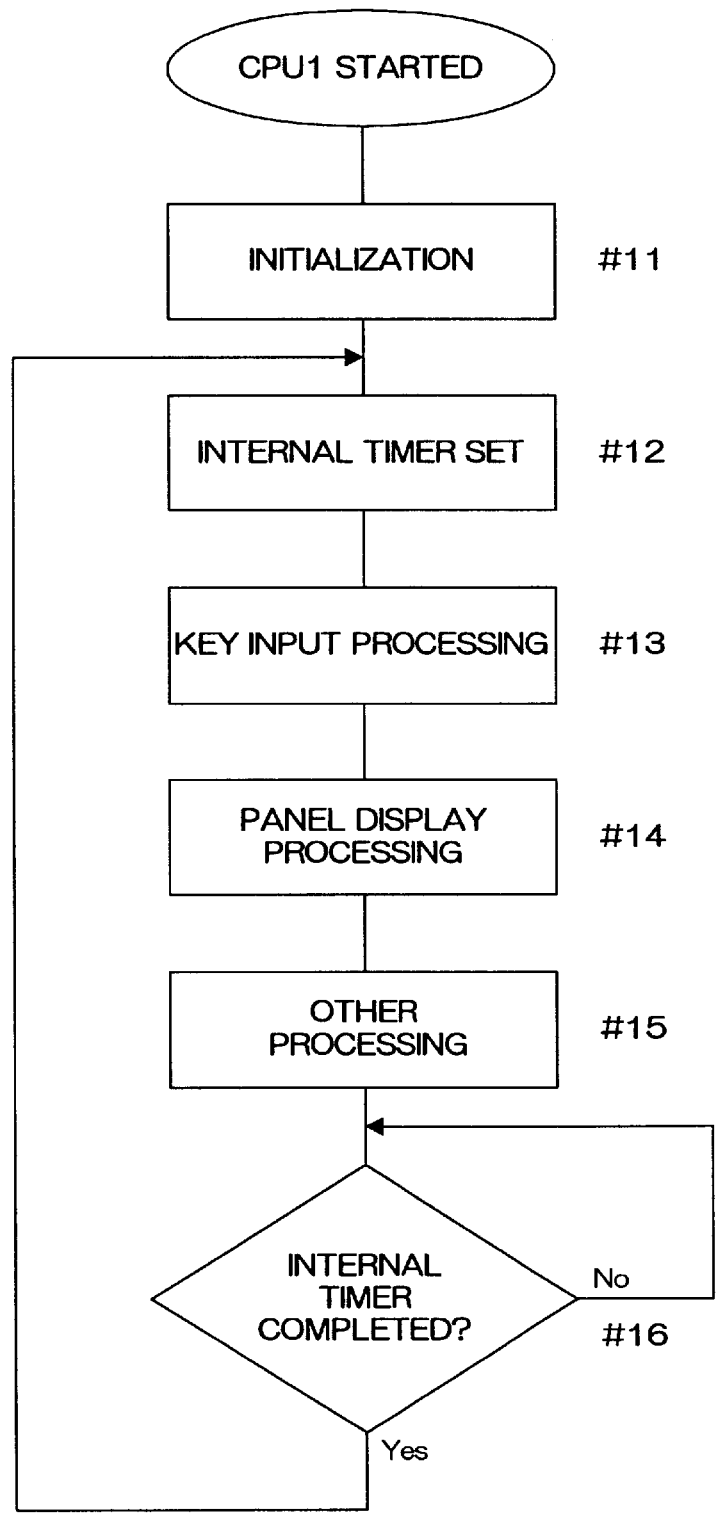
FIG. 12 is a main flow chart for central processing unit (CPU) 101 which manages the control of the operation panel.

FIG. 12 is a main flow chart of CPU 1 (101) which controls the operation panel.

When the power source is turned ON, first, the RAM and registers are initialized (#11). Then, an internal timer is set to regulate the length of one routine (#12), and the key input process is executed to receive key operations (#13). Thereafter, the display data are set and displayed based on the input key information and status of the digital copier 1 (#14). In step #15, other processes are executed, and in step #16 the end of the internal timer is awaited, and the processes from step #12 are repeated. Interrupt processing is executed with suitable timing to communicate with other CPUs.

Figure 13:
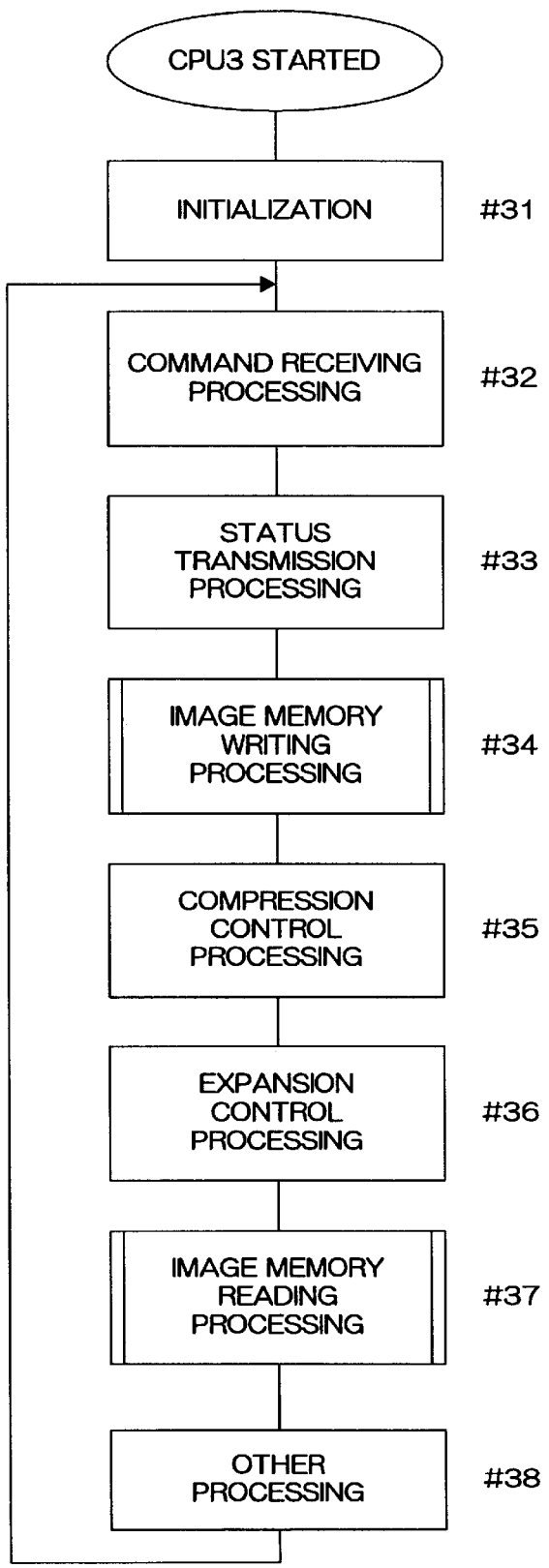
FIG. 13 is a main flow chart for CPU 3 which manages the control of memory unit 30.

FIG. 13 is a main flow chart for CPU 3 (103) which controls memory unit 30.

When the power source is turned ON, first the RAM and registers are initialized (#31). Then, the reception process is executed to receive commands from other CPUs (#32), and status signals indicating the state of CPU 3 (103) are transmitted to other CPUs (#33). In step #34, image data are recorded in image memory 304, the image data of image memory are encoded and stored in code memory 306. In this step, processing is also executed to transmit image data to an external device in accordance with conditions described later. The image data transmission process is described in detail later with reference to FIGS. 16 and 17. In step #35, a compression control process is executed to encode image data transmitted from image memory 304, and in step #36 an expansion control process is executed to convert code data from code memory 306 to the original image data. In step #37, code data stored in code memory 306 are read out and expanded in image memory 304, and image data are transmitted form image memory 304 to print processor 40. In this step, processing is also executed to return image data from an external device in accordance with conditions described later. The image data return transmission process is described in detail later with reference to FIGS. 18 and 19. In step #38, other processes are executed relating to memory unit 30, and the processes from step #32 are repeated.

Figure 14:
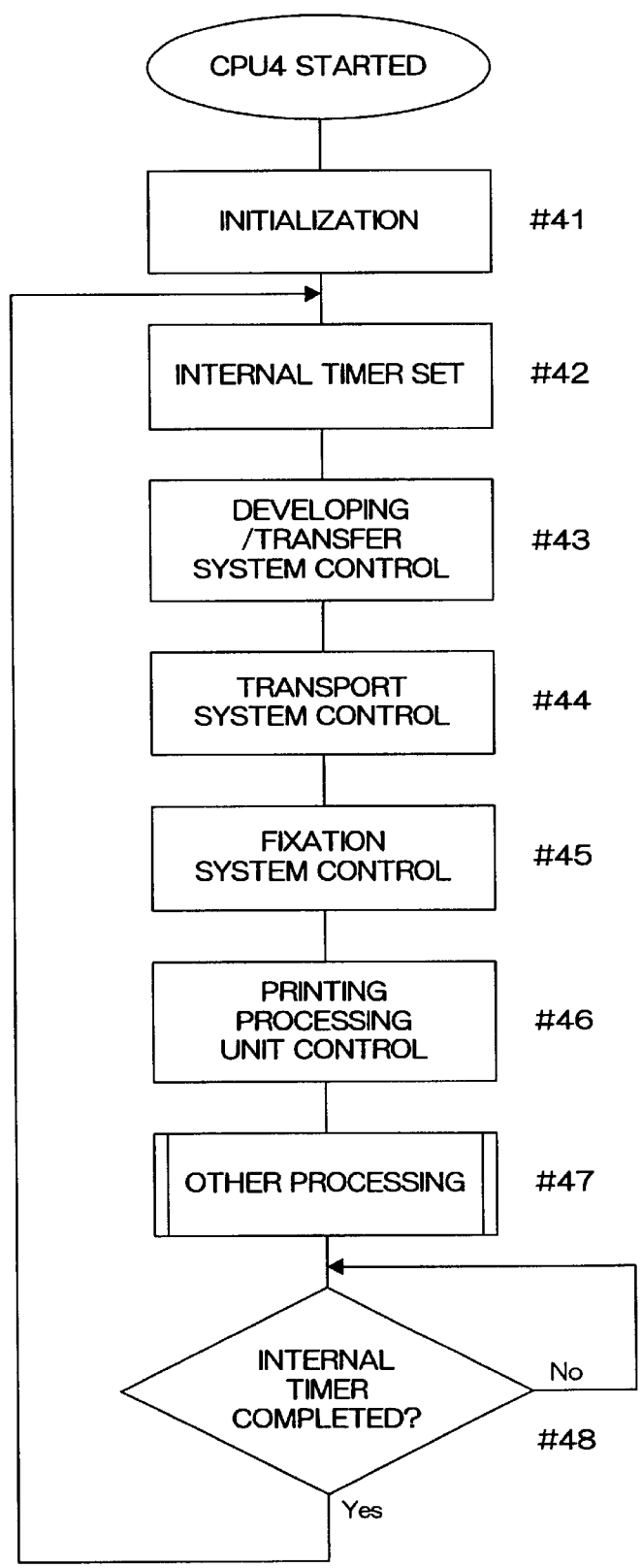
FIG. 14 is a main flow chart for CPU 4 which manages control of the printer unit 3.

FIG. 14 is a main flow chart for CPU 4 (104) which controls printer unit 3.

When the power source is turned ON, first the RAM and registers are initialized (#41), then an internal timer is set to regulate the length of one routine (#42).

Thereafter, control of processes for developing and transfer are executed (#43), control of the transport system is executed for copy sheet feeding and document transport (#44), control of the fixing unit is executed for fixing temperature regulation and the like (#45), and control is executed for the print processor 40 for controlling emission of the laser diode (#46).

The contents of the controls of steps #43~#46 are omitted from this description because they are well known in the art, but briefly, the paper jam detection is executed in step #44, and detection of abnormalities of the fixing heater such as heater shutoff are executed in step #45.

In step #47, other controls are executed for printer unit 3, and in step #48 the end of the internal timer is awaited, and the processes of step #42~#48 are repeated. The other processes executed in step #47 include a paper detection process to detect an out-of-paper condition, abnormal condition confirmation process, and power source ON process; among these processes, various information is transmitted to CPU 3 (103) such as power source OFF request, and image data transmission and retransmission requests based on various abnormal condition detection such as detection of a confirmed out-of-paper condition, paper jam detection and the like. Details of other processes (step #47) are described later with reference to FIGS. 20~23.

Figure 15:
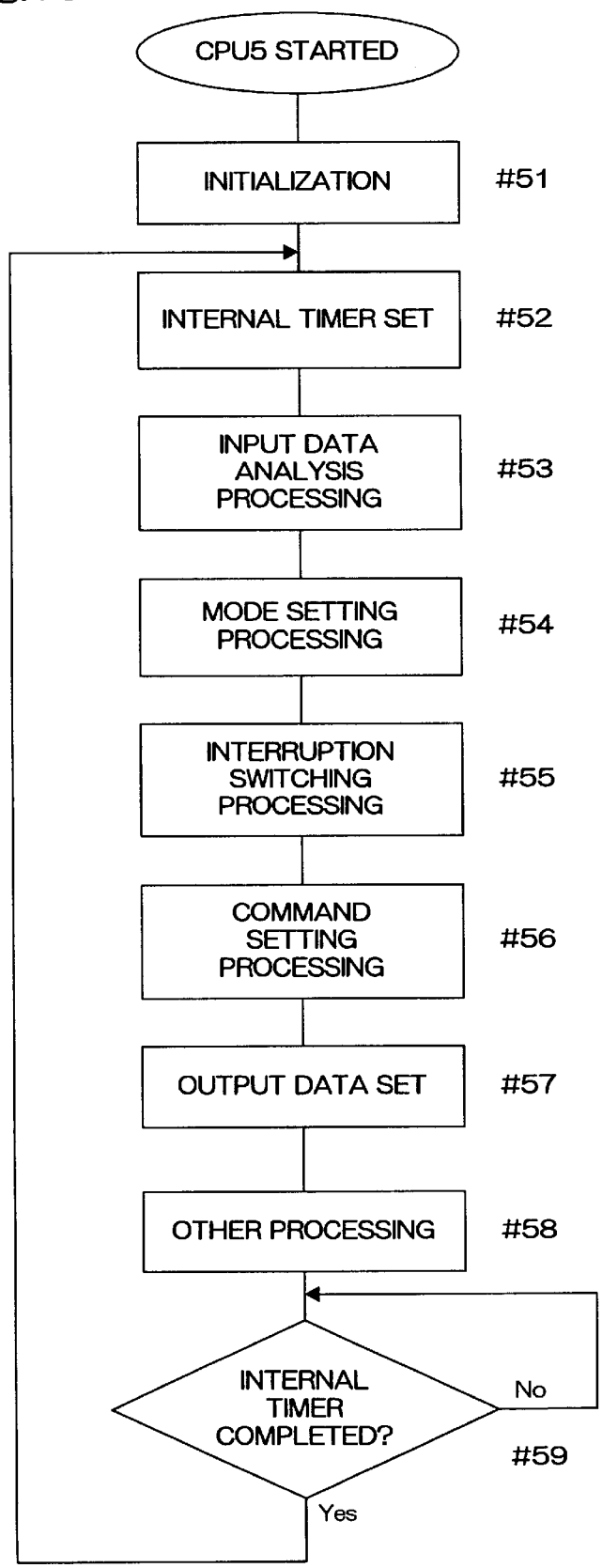
FIG. 15 is a main flow chart for CPU 5 which manages overall timing adjustment for the digital copier 1.

FIG. 15 is a main flow chart for CPU 5 (105) which regulates the overall timing of the digital copier 1.

When the power source is turned ON, first, the RAM and registers are initialized (#51), then, an internal timer is set to regulate the length of one routine (#52).

Then, an input data analysis process is executed to check data input from other CPUs (#53), a mode setting process is executed to set various operation modes in accordance with operation content (#54), interrupt switching process is executed for interrupt processes (#55), command setting process is executed for setting commands in accordance with the set modes (#56), and output data process is executed to await the set commands in communication reports (#57).

In step #58, other controls are executed by CPU (105), and in step #59 the end of the internal timer is awaited, and the processes of steps #52~#59 are repeated.

Figure 16:
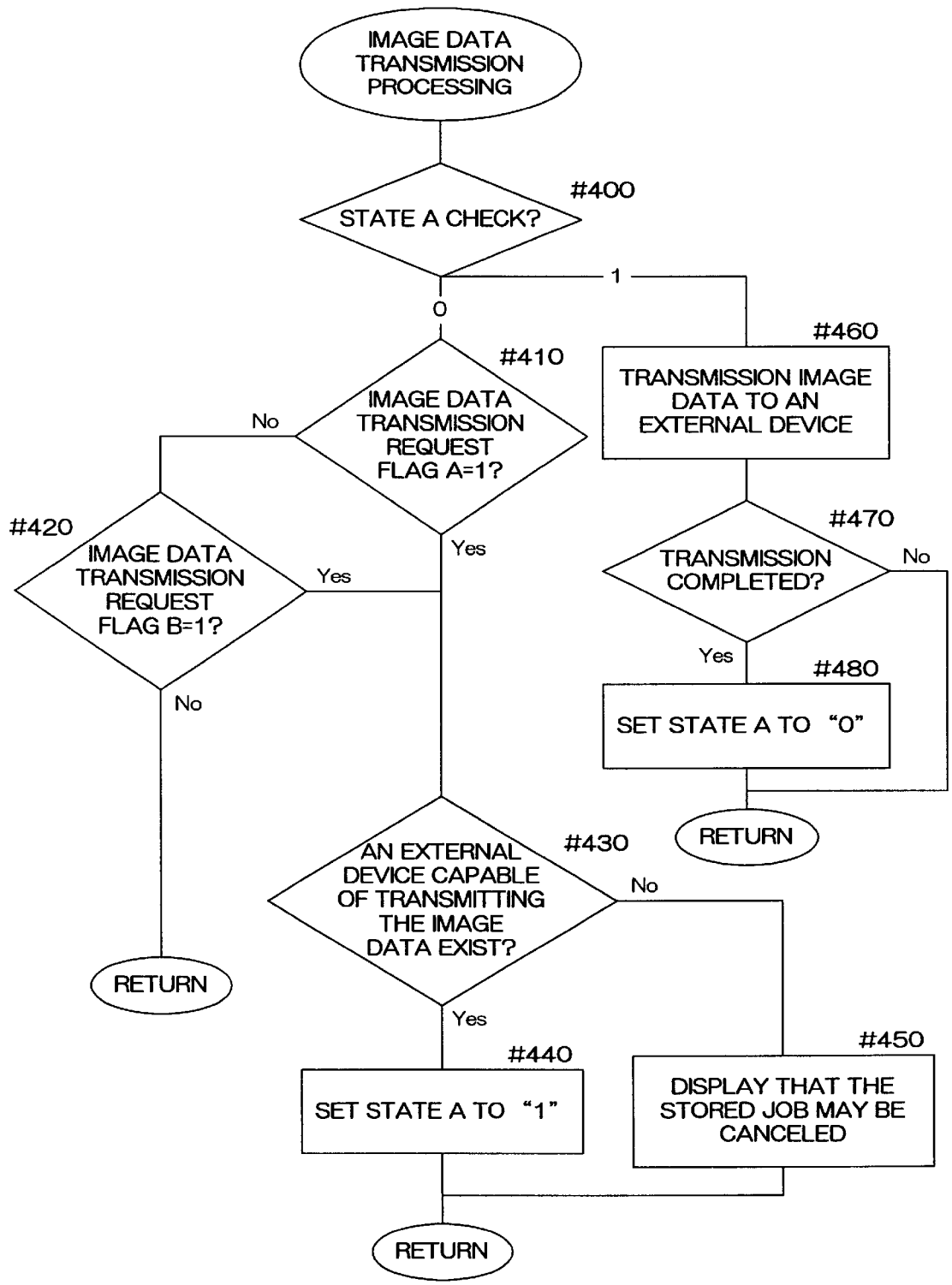
FIG. 16 is a flow chart for the image data transmission process which is one subroutine in the image memory recording process of FIG. 13.
Figure 17:
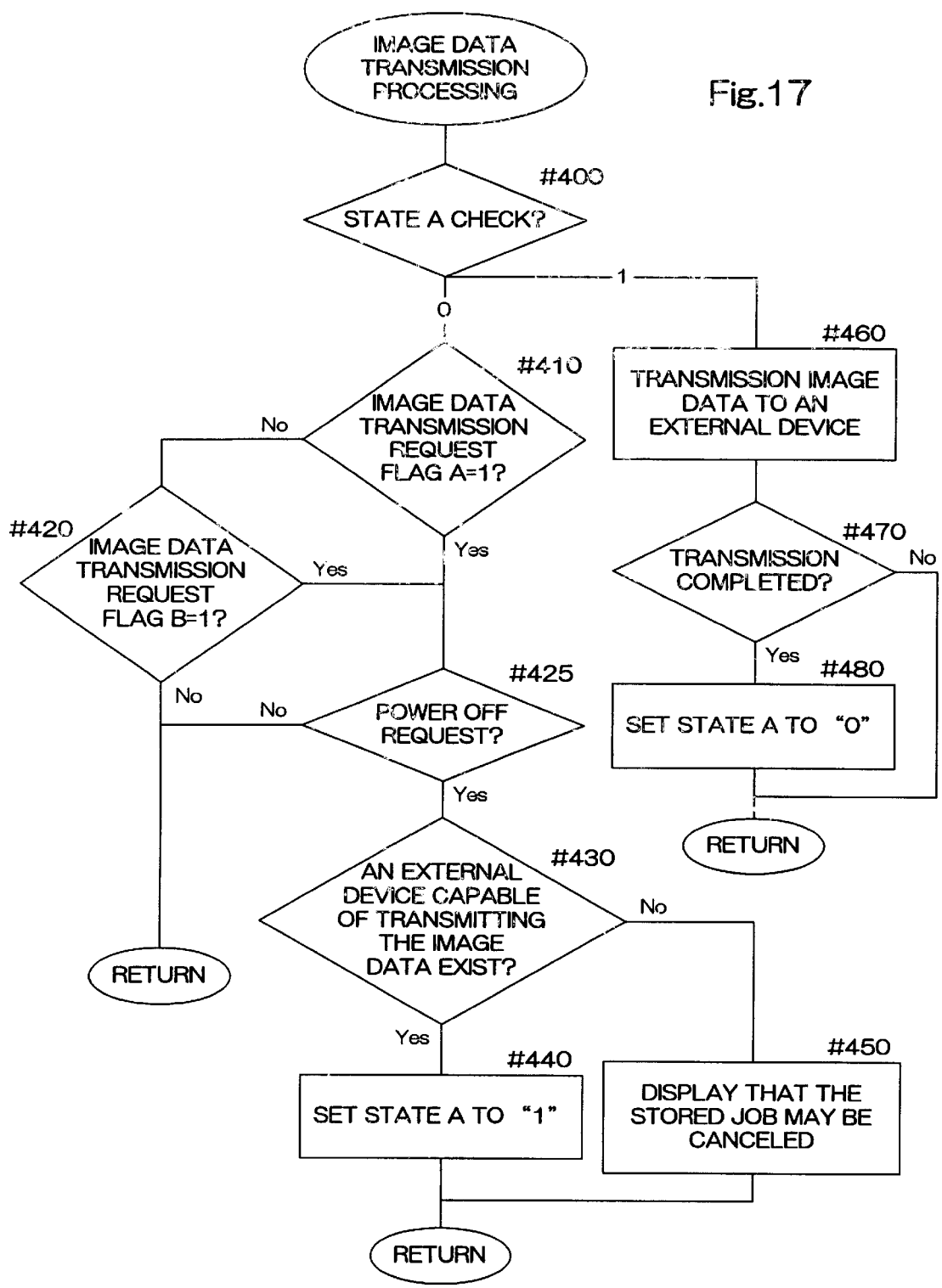
FIG. 17 is a flow chart showing another example of an image data transmission process.

FIG. 16 is a flow chart showing the image data transmission process of one routine in the image memory recording process (#34) of FIG. 13. FIG. 17 is a flow chart showing another example of a image data transmission process.

First, in step #400, a state A check is executed. state A is set at [0] during initialization, and the following process branches depending on the content of state A.

When state A is set at [0], a check is made in step #410 to determine whether or not image data transmission request flag A is set at [1]. When flag A is set at [1], a check is made to determine whether or not an external device is able to transmit image data, i.e., whether or not image data can be stored in an external device connected to the network (#430). This determination is executed by means of a control command in the program executed by CPU 3 via external IF 310. Image data transmission request flag A is set in the paper condition detection process of FIG. 21 described later, and is set at [1] during an out-of-paper condition.

In step #410, a determination is made as to whether or not the image data transmission request flag B is set at [1] when the image data transmission request flag A is set at [0]. When flag B is set at 1, a determination is made as to whether or not an external device is capable of transmitting data (#430). Image data transmission request flag B is set in the abnormal state confirmation process of FIG. 22 described later, and is set at [1] during a paper jam or abnormal state. When the image data transmission request flag B is set at [0] in step #420, this subroutine returns directly and the main routine ends.

When an external device is able to transmit data in step #430, state A is set at [1] in step #440, and this subroutine ends. When an external device able to transmit image data is not present in step #430, there is a possibility that the job recorded in code memory 306 may be disrupted because image data cannot be transmitted to an external device, and a warning is displayed on liquid crystal display 801 (#450), and this subroutine ends.

When state A is set at [1] in step #400, image data are transmitted to an external device in step #460. The management table (FIG. 8) is used in the transmission of image data at this time. For example, image data are transmitted with appended information such as job number information, page number information, job memory capacity and the like. When a plurality of jobs are recorded, said plurality of jobs are transmitted during standby. Then, a determination is made in step #470 as to whether or not image data transmission is completed. When it is determined that data transmission has ended, state A is set at [0], and this subroutine ends, whereas when data transmission has not ended (#470: NO), this routine ends directly.

In this subroutine, image data are transmitted to an external device connected to the network when an abnormal state occurs such as an out-of-paper condition, paper jam state And the like via the determination of the image data transmission request flags A and B. In this way stored jobs are not erased unbeknownst to an operator when the power source is shut OFF in conjunction with auto power OFF function when operation does not resume a predetermined time during a print stoppage, or in conjunction with clearing a paper jam or other abnormal condition.

FIG. 17 is a flow chart showing another example of the image data transmission process. In the drawing, steps having numbers identical to those in FIG. 16 are identical and are not mentioned further.

In FIG. 17, step #425 is a newly added step. When it is determined that image data transmission request flags A and B are set at [1] in steps #410 and #420, a determination is made in #425 as to whether or not a power OFF request has been issued. When it is determined a power OFF request has been issued in step #425, the processes of step #430 and subsequent steps are executed, whereas when it is determined that a power OFF request has not been issued, this subroutine ends directly. The power OFF request is a command set in the power OFF control subroutine (FIG. 23) described later, and is output from CPU 4 when the operation panel has not been operated for a predetermined time during a print operation stoppage. In the subroutine of FIG. 17, the aforesaid processes execute image data transmission to an external device connected to the network when operation has not resumed after a predetermined time following occurrence of an out-of-paper condition, paper jam, or other abnormal condition. These processes execute image data transmission only when there has been no operation for a predetermined time to prevent unnecessary transmissions to external devices.

Figure 18:
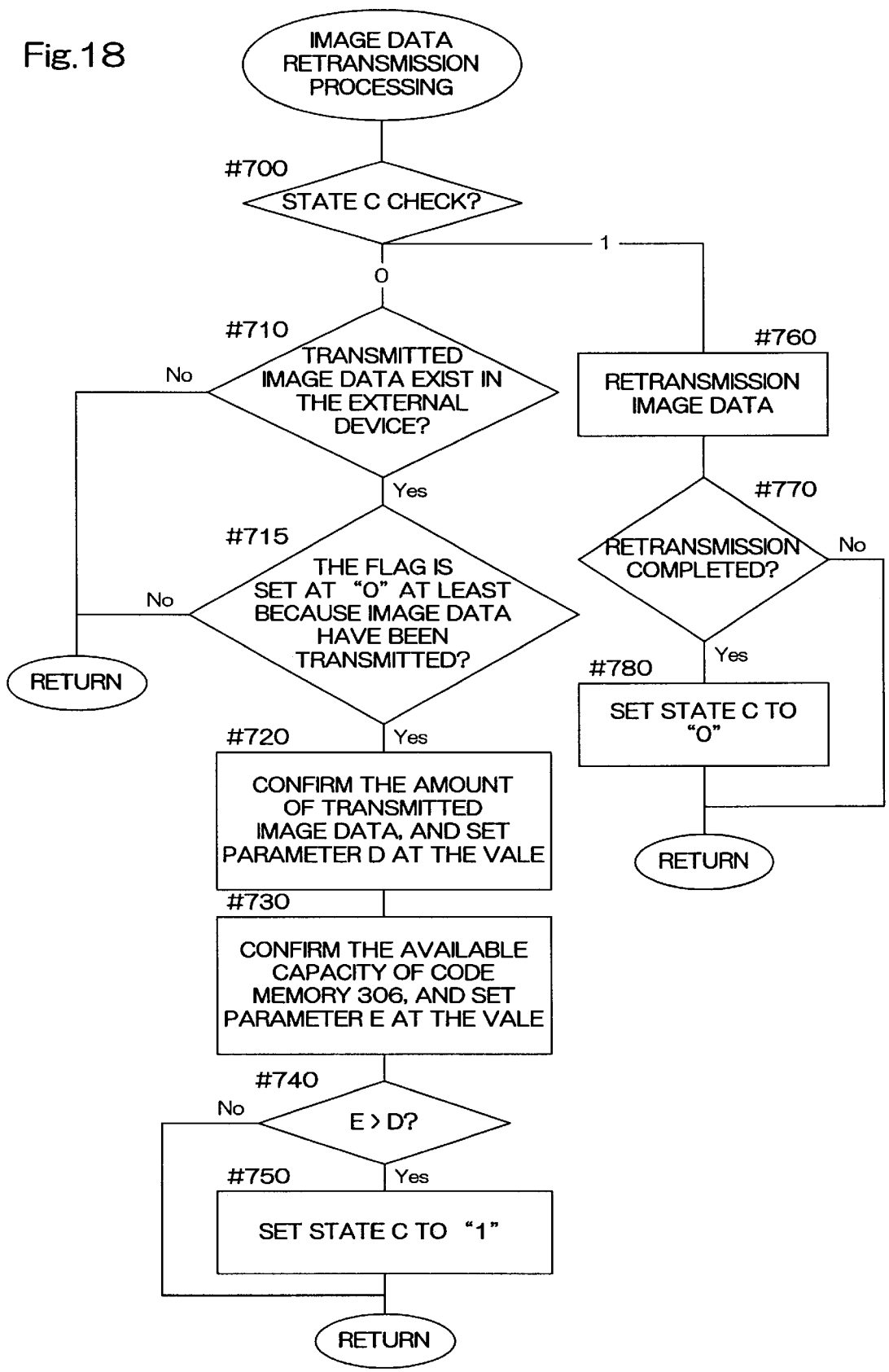
FIG. 18 is a flow chart of the image data retransmission process which is one subroutine in the image memory reading process of FIG. 13.
Figure 19:
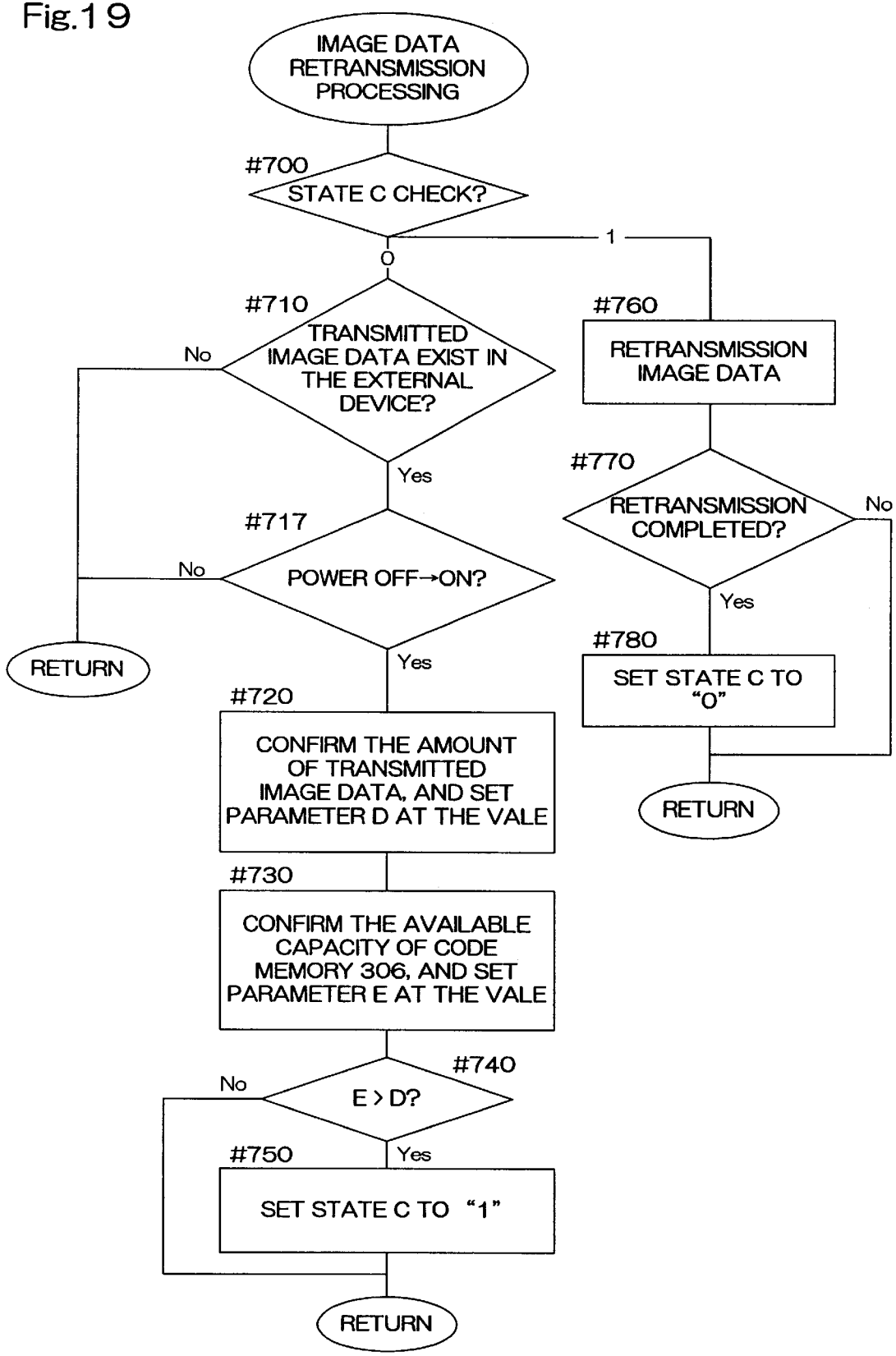
FIG. 19 is a flow chart showing another example of an image data retransmission process.

FIG. 18 is a flow chart of the image data retransmission process of one subroutine in the image memory reading process (#37) of FIG. 13. FIG. 19 is a flow chart showing another example of the image data retransmission process.

First, state C is checked in step #700. State C is set at [0] at initialization, and the following processes branch depending on the content of state C.

When state C is determined to be set at [0] by the check performed in step #700, a check is made to determine whether or not image data have been transmitted to an external device by the aforesaid image data transmission process (#710). When there are no transmitted data, this routine ends directly. When it is determined there are transmitted image data in step #710, a check is made in step #715 to determine whether or not the flag is set at [0] at least because image data have been transmitted to an external device. This flag is the image data transmission request flags A and B used to determined image data transmission in the previously mentioned image data transmission process. In the paper condition detection process of FIG. 21, the image data transmission request flag A is set at [0] when both cassettes 81a and 81b are in not empty conditions (i.e., accommodate paper), and when the cassette specified by a job being printed accommodates paper. In the abnormal state Confirmation process of FIG. 22, the image data transmission request flag B is set at [0] when there are not paper jams or abnormal conditions (abnormality resolved state).

This subroutine ends when the cause of image data transmission has been corrected in step #715 (#715: NO), and the processes of step #720 and subsequent steps are executed when these abnormal conditions have not been eliminated (#715: YES).

In step #720, the amount of the data transmitted to the external device is confirmed, and a value expressing this amount is substituted in parameter D. In step #730, the available capacity of code memory 306 is confirmed, and a value expressing this available capacity is substituted in parameter E.

Then, in step #740, the values of parameters D and E are compared, and when the value of parameter E is larger state C is set at [1] in step #750 and this subroutine ends, whereas when parameter D is larger this subroutine ends directly.

When it is determined that state C is set at [1] in step #700, a process is executed in step #760 to return image data previously transmitted to the external device back from the external device. Then, a determination is made as to whether or not the return of image data has been completed (#770). When the return of image data has been completed, state C is set at [0] in step #780, and this subroutine ends, whereas this subroutine ends directly of the return of image data is not complete.

When the cause of the image data transmission (e.g., out-of-paper condition, paper jam condition other abnormal condition) has been corrected, image data which were transmitted to an external device on the network are returned via the process of the aforesaid subroutines on the condition that there is sufficient capacity available in code memory 306. In this way printing can be easily restarted without requiring an operator to again input image data in order to restart printing.

FIG. 19 is a flow chart showing another example of an image data return process. In the drawing, step numbers in common with FIG. 18 are identical steps and are not described further.

In this subroutine, the process of step #717 is substituted for step #715, and other processes are identical to those of FIG. 18.

In step #717, a determination is made as to whether or not the power source timing is active. When the power source timing has not changed form OFF to ON in #717 (#717: NO), this subroutine ends directly, whereas when the power source timing has changed from OFF to ON (#717: YES), the processes of steps #717 and subsequent steps are executed.

When the power source of digital copier 1 is turned ON, image data previously transmitted to an external device on the network are returned from said external device via the aforesaid processes on the condition that sufficient capacity is available in code memory 306. In this way printing can be easily restarted without requiring an operator to again input image data in order to restart printing.

Other processes (#47) of the main flow chart (#14) of CPU 4 are described below with reference to FIGS. 20–23.

Figure 20:
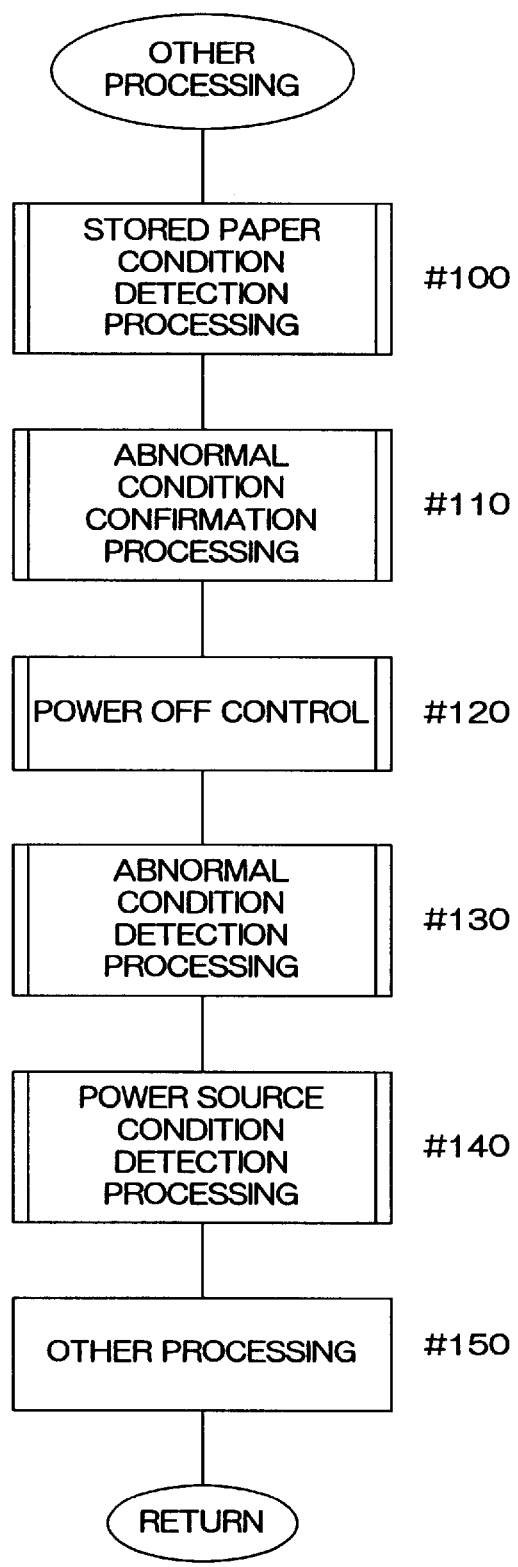
FIG. 20 is a subroutine showing the content of other processes of the main flow chart of CPU 4.

FIG. 20 is a subroutine of the content of other processes (#47), and in this subroutine other processes are executed including paper condition detection process (#100), abnormal state Confirmation process (#110), power OFF control (#120) and the like, and thereafter various communication processes with the other CPUs are executed such as the abnormal condition detection process (#130), power source condition detection process (#140) and the like, whereupon this subroutine ends. Various abnormal conditions such as paper jams and other abnormal conditions are detected in the abnormal condition detection process (#130), and the controls of the detection processes are well known and therefore omitted form this description. In the power source condition detection process (#140), the operational condition of the relay switch of the power source is checked, and changes from ON to OFF state as well as OFF to ON state are detected. The content of each subroutine is described below.

Figure 21:
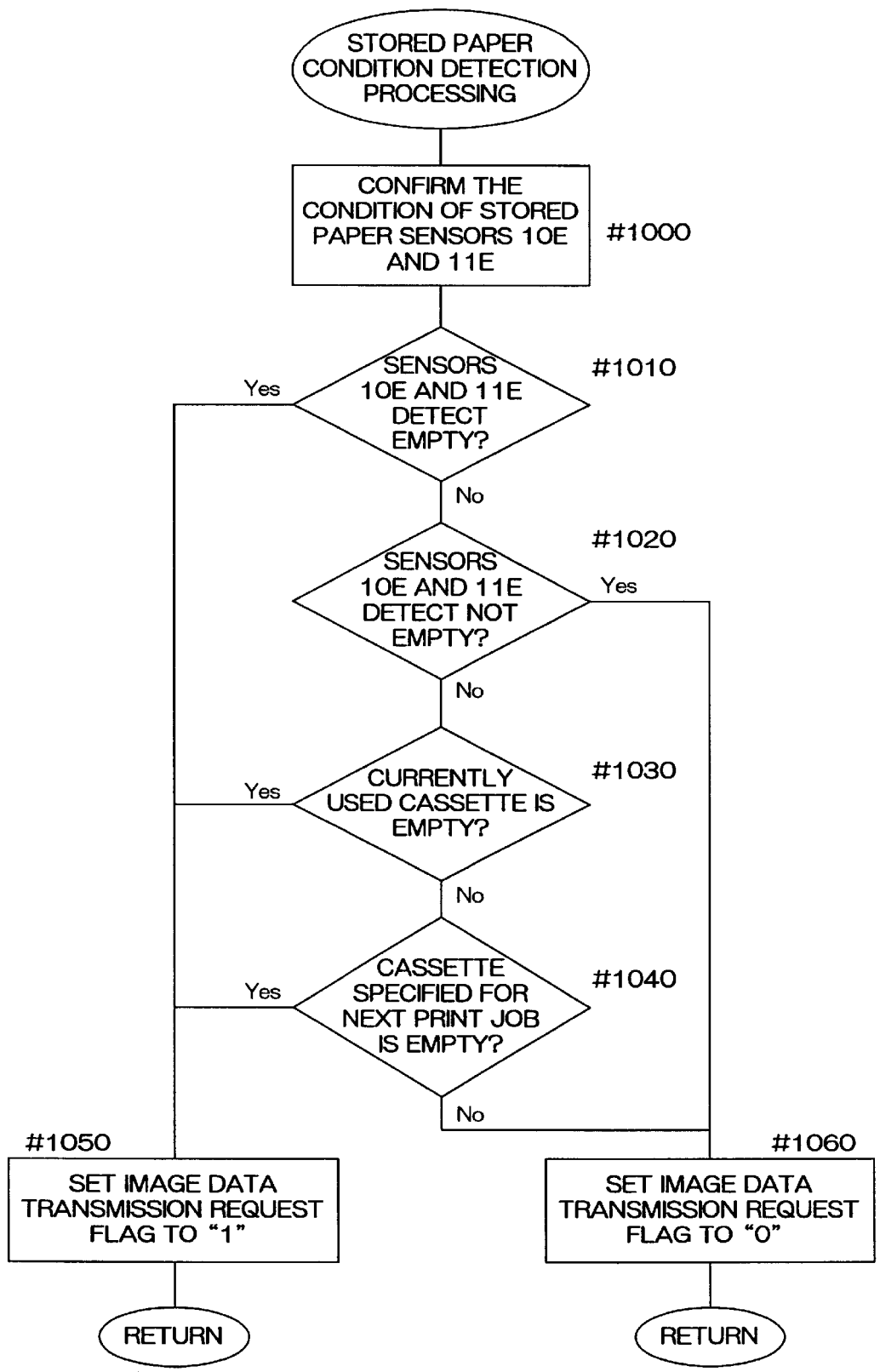
FIG. 21 is a subroutine of the accommodated paper detection process of FIG. 20.

FIG. 21 is a flow chart showing the content of the subroutine of the paper condition detection process (#100).

When this subroutine is executed, first, in step #1000, a process is executed to confirm the condition of paper sensors 10E and 11E.

Then, in step #1010, a determination is made as to whether or not an out-of-paper condition exists (i.e., whether or not paper cassette 81a or 81b is empty) based on the output of sensors 10E and 11E. When both sensors detect an out-of-paper condition, the image data transmission request flag A is set at [1] in step #1050, and this subroutine ends. The information of flag A is transmitted to CPU 3, and a process to transmit image data together with said flag A information is executed (FIGS. 16 and 17).

When the determination in step #1010 is negative (#1010: NO), a determination is made in step #1020 as to whether or not both sensors 10E and 11E have detected "not empty" conditions (i.e., both cassettes 81a and 81b contain paper). When both sensors detect a "not empty" condition, the image data transmission request flag A is set at [0] in step #1060, and this subroutine ends.

When the determination in step #1020 is negative (#1020: NO), a determination is made as to whether or not a sensor detects an out-of-paper condition for the cassette being used for a currently executing print job (i.e., the currently used cassette is empty) in step #1030. When an out-of-paper condition is detected, the image data transmission request flag A is set at [1] in step #1050, and this subroutine ends.

When the determination in step #1030 is negative (#1030: NO), a determination is made as to whether or not a sensor has detected an out-of-paper condition for the cassette specified for the next print job (i.e., the specified cassette is empty) in step #1040. When an out-of-paper condition is detected, the image data transmission request flag A is set at [1] in step #1050, and this subroutine ends.

When the determination in step #1040 is negative (#1040: NO), the image data transmission request flag A is [0] in step #1060, and this subroutine ends.

The image data transmission request flag A is set at [1] when both cassettes 81a and 81b are out of paper, when the cassette currently used for printing is out of paper, and when the cassette specified for the next print job is out of paper. When the aforesaid condition is corrected by replenishing paper in the cassette, the image data transit request flag A is set at [0]. Although the example of the present embodiment provides two paper cassettes, it is to be noted that the procedure is identical when three or more cassettes are provided. In such instances, the condition of the sensors for the specified number of cassettes is monitored in the processes of steps #1000–#1020. Furthermore, although the presence/absence of paper is monitored in the present embodiment as one example of paper condition detection, the present invention is not limited to this mode inasmuch as image data may be transmitted when paper is out based on a desired paper size or type. Image data may also be transmitted when the remaining paper falls below a predetermined amount rather than completely empty.

Figure 22:
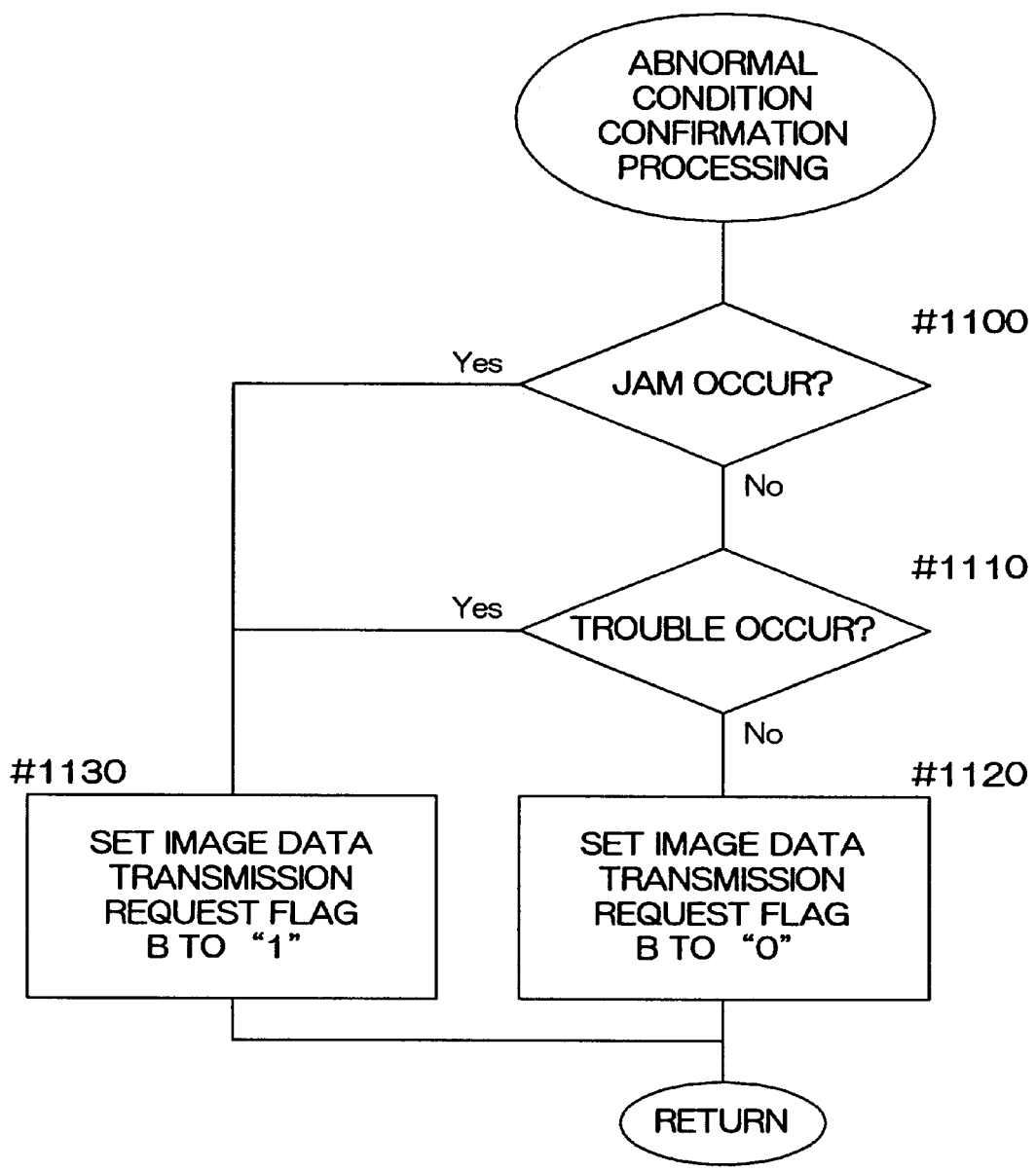
FIG. 22 is a subroutine of the abnormal condition confirmation process of FIG. 20.

FIG. 22 is a flow chart showing the content of abnormal state Confirmation process subroutine (#110).

When this subroutine is executed, a determination is made as to whether or not a paper jam has occurred in step #1100. When a paper jam has occurred, the image data transmission request flag B is set at [1] in step #1130, and this subroutine ends. The information of flag B is transmitted to CPU 3, and the process for transmitting image data together with the information in CPU 3 is executed (FIGS. 16 and 17).

When it is determined that a paper jam has not occurred in step #1100, it is determined that an abnormal condition (trouble) has not occurred in step #1110. Possible abnormal conditions include abnormal conditions of the fixing unit such as fixing heaters shut OFF abnormal temperature regulation and the like, abnormal conditions of the document scanning unit such as out-of-step scanner motor and the like, and more general problems of the digital copier such as out-of-toner condition, eraser lamp shut OFF and the like.

When an abnormal condition is determined in step #1110, the image data transmission request flag B is set at [1] in step #1130, and this subroutine ends. When an abnormal condition is not determined, the image data transmission request flag B is set at [0] in step #1120, and this subroutine ends.

When a paper jam or other abnormal condition (trouble) occurs, the image data transit request flag B is set at [1], and when the jam or abnormal condition is corrected, the image data transmission request flag B is set at [0] by the aforesaid process.

Figure 23:
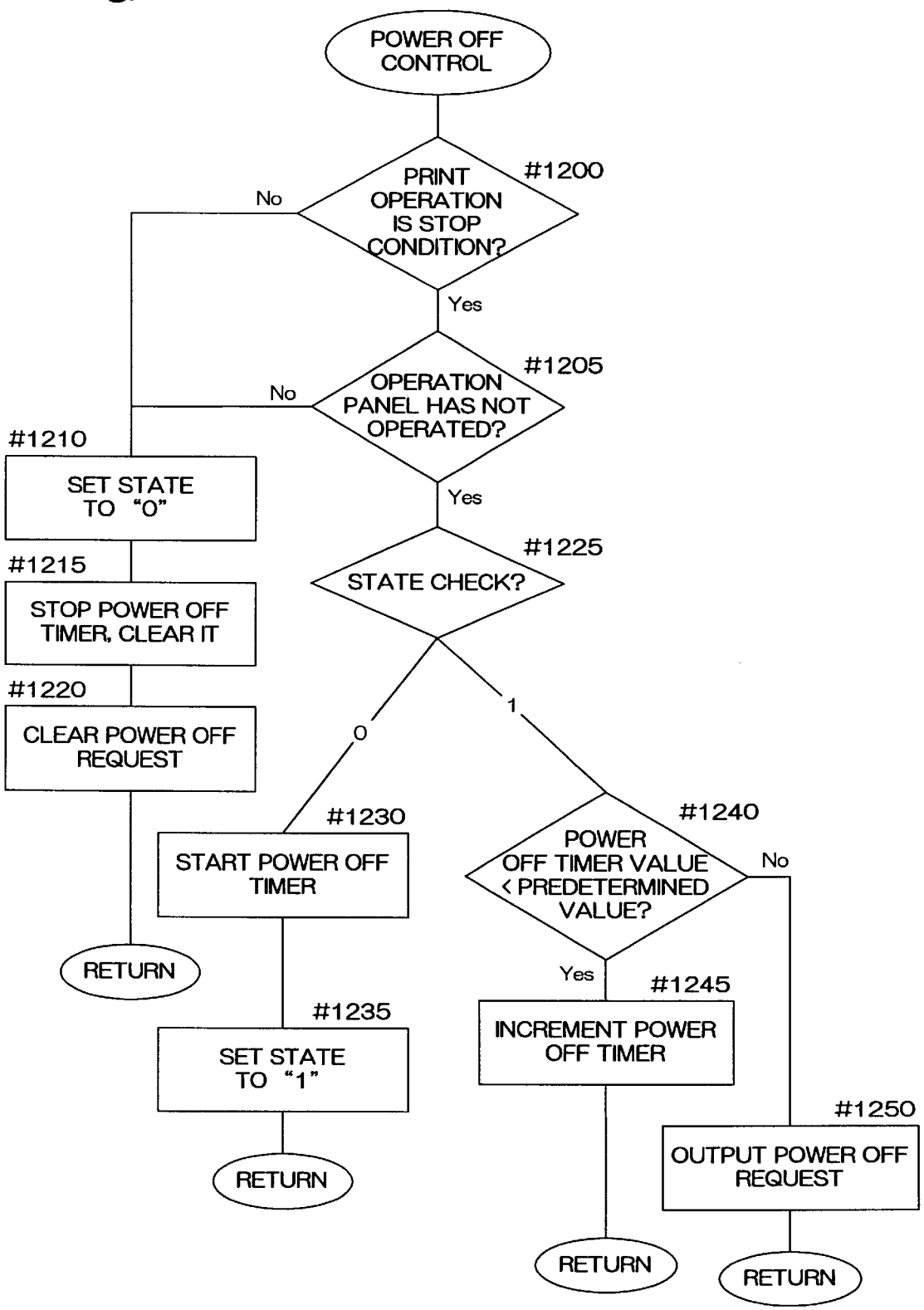
FIG. 23 is a subroutine of the power source OFF control of FIG. 20.

FIG. 23 is a flow chart showing the content of the power source OFF control (#120) subroutine.

When this subroutine is executed, first, a determination is made in step #1200 as to whether or not a print operation has been stopped. If a print operation has been stopped, the state is set at [0] in step #1210. Then, in step #1215, the power OFF timer stop and timer value is cleared and reset at [0], and in step #1220 the power OFF request is cleared and this subroutine ends.

When a print operation has stopped in step #1200, a determination is made in step #1205 as to whether or not operation panel 800 has been operated. If the operation panel has not been operated, the processes of step #1245 and subsequent steps are executed. When the operation panel has been operated, the processes of steps #1210, #1215, and #1220 are executed, and this subroutine ends.

When it is determined that the operation panel has not been operated in step #1205, the state is confirmed in step #1225, and the subroutine branches to the processes described below. When a power ON state is determined, initialization values of [0] are set in the main flow of CPU 4 (FIG. 14).

First, when the state is set at [0], the power OFF timer is started in step #1230, and the state is set at [1] in step #1235, and this subroutine ends.

When the state is set at [1], a check is made to determine whether or not the power OFF timer value is less than a predetermined value in step #1240. When the power OFF timer value is less than a predetermined value, the power OFF timer is incremented in step #1245, and this subroutine ends, whereas when the power OFF timer value is not less than a predetermined value, a power OFF request is output, and this subroutine ends.

A power OFF request is output when there the operation panel has not been operated for a predetermined time following a print operation stoppage. This information is transmitted to CPU 3, and CPU 3 execute processes to transmit this information together with image data (FIG. 17). When a power OFF request is received, the power OFF process is actually executed after a predetermined time in the other processes of step #150 shown in FIG. 20.

The present invention provides that image data are transmitted to an external device connected to the network in conjunction with a paper jam, predetermined paper supply condition such as an out-of-paper condition, or other abnormal condition. In this way jobs are not erased unbeknownst to an operator when power is automatically shut OFF due to lack of operation for a predetermined time following a print operation stoppage, or when power is shut OFF in conjunction with the correction of a paper jam or other abnormal condition.

The present invention further provides that when the cause of the image data transmission (e.g., out-of-paper condition, paper jam, other abnormal condition) has been corrected or when power is restored to the digital copier 1, the image data previously transmitted to an external device on the network are returned to the digital copier 1. In this way printing can be easily restarted by executing a restart continuous operation process without requiring an operator to again input image data in order to restart printing.

The present invention further provides that image data is transmitted to an external device connected to the network on the condition that there has not been any operation of the digital copier 1 for a predetermined time during said transmission. Therefore, data transmission is executed only when there has not been any operation for a predetermined time, thereby preventing unnecessary transmission to an external device.

In the present invention, A single input document or plurality of input documents are stored as one or a plurality of jobs in single job units, and said plurality f jobs on standby are transmitted during the aforesaid transmission time, and are returned to the digital copier and restarted. Accordingly, the cumbersome operations of setting modes and re-entering image data for said plurality of jobs is reduced when restarting the jobs.

In the present invention, the presence/absence of an external device capable of transmitting is confirmed when transmitting image data to an external device, and a warning is displayed when a transmission-enabled external device is not present. Therefore, the possibility of data loss is provided to a user beforehand.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus, comprising:
    a memory for storing image data;
    an image forming unit for forming an image on a recording medium based on the image data stored in said memory;
    a communication unit;
    a detector for detecting trouble relating to said recording medium; and
    a controller for transmitting image data from said memory to an external device via said communication unit when trouble is detected by said detector, and for subsequently receiving from said external device via the communication unit after said trouble has been cleared, the image data which had been previously transmitted by said communication unit to said external device.

2. An image forming apparatus as claimed in claim 1, wherein said trouble relating to the recording medium is a jam of the recording medium.

3. An image forming apparatus as claimed in claim 1, further comprising:
    a storing unit for storing a plurality of recording mediums;
    wherein said trouble relating to the recording medium is detected when said storing unit for storing a plurality of recording mediums is empty.

4. An image forming apparatus as claimed in claim 1, wherein said controller transmits the image data when a predetermined time has elapsed without operation after detection of the trouble.

5. An image forming apparatus as claimed in claim 1, further comprising:
    an image reader for reading document images;
    wherein said memory stores a plurality of jobs, each job including a single document image or a plurality of document images read by the image reader.

6. An image forming apparatus as claimed in claim 1, further comprising:
    determination means for determining the presence/absence of an external device to which the image data can be transmitted from the image forming apparatus.

7. An image forming apparatus as claimed in claim 6, further comprising:
    warning means for warning when said determination means determines the absence of the external device.

8. An image forming apparatus as claimed in claim 1, wherein said controller includes:
    a detector for detecting an available memory storage capacity and the amount of the transmitted image data;
    wherein said controller receives the transmitted image data when the available memory storage capacity is more than the amount of the transmitted image data.

9. An image forming apparatus as claimed in claim 1, wherein said external device is an image forming apparatus.

10. An image forming apparatus, comprising:
    a memory for storing image data;
    an image forming unit for forming an image on a recording medium based on said image data stored in said memory;
    a communication unit;
    a power source condition detector for detecting an ON/OFF condition of a power source;
    a trouble detector for detecting trouble relating to said recording medium; and
    a controller for transmitting image data from said memory to an external device via said communication unit when trouble is detected by said trouble detector, and for subsequently receiving from said external device via said communication unit when a change in the power source from an OFF condition to an ON condition is detected by said power source condition detector, the image data which had been previously transmitted by said communication unit to said external device.

11. An image forming apparatus as claimed in claim 10, wherein said trouble relating to the recording medium is a jam of the recording medium.

12. An image forming apparatus as claimed in claim 10, further comprising:
    a storing unit for storing a plurality of recording mediums;
    wherein said trouble relating to the recording medium is detected when said storing unit for storing a plurality of recording mediums is empty.

13. An image forming apparatus as claimed in claim 10, wherein said controller transmits the image data when a predetermined time has elapsed without operation after detection of the trouble.

14. An image forming apparatus as claimed in claim 10, further comprising:
    an image reader for reading document images;
    wherein said memory stores a plurality of jobs, each job including a single document image or a plurality of document images read by the image reader.

15. An image forming apparatus as claimed in claim 10, further comprising:
    determination means for determining the presence/absence of an external device to which the image data can be transmitted from the image forming apparatus.

16. An image forming apparatus as claimed in claim 15, further comprising:
    warning means for warning when said determination means determines the absence of the external device.

17. An image forming apparatus as claimed in claim 10, said controller including:
    a detector for detecting an available memory storage capacity and the amount of the transmitted image data;
    wherein said controller receives the transmitted image data when the available memory storage capacity is more than the amount of the transmitted image data.

18. An image forming apparatus, comprising:

a memory which stores image data;

an image forming unit which forms an image by operating a plurality of image forming elements;

a communication unit;

a detector which detects trouble relating to at least one among said plurality of said image forming elements; and a controller which transmits image data from said memory to an external device via said communication unit when trouble is detected by said detector, and subsequently receives from said external device via said communication unit after said trouble has been cleared, the image data which had been previously transmitted by said communication unit to said external device.

19. An image forming apparatus as claimed in claim 18, wherein said controller transmits the image data when a predetermined time has elapsed without operation after detection of the trouble.

20. An image forming apparatus as claimed in claim 18, further comprising:

an image reading apparatus for reading document images;

wherein said memory stores a plurality of jobs, each job including a single document image or a plurality of document images read by the image reading apparatus.

21. An image forming apparatus as claimed in claim 18, further comprising:

determination means for determining the presence/absence of an external device to which the image data can be transmitted from the image forming apparatus; and warning means for warning when said determination means determines the absence of the external device.

22. An image forming apparatus as claimed in claim 18, wherein said controller includes:

a detector for detecting an available memory storage capacity and the amount of the transmitted image data;

wherein said controller receives the transmitted image data when the available memory storage capacity is more than the amount of the transmitted image data.

23. An image forming apparatus as claimed in claim 18, wherein said memory stores a plurality of jobs, and wherein said controller transmits image data of a plurality of jobs.

24. An image forming apparatus, comprising:

a memory which stores image data;

a communication unit;

a power source condition detector which detects an ON/OFF condition of a power source;

a trouble detector which detects trouble relating to said apparatus; and a controller which transmits image data from said memory to an external device via said communication unit when trouble is detected by said trouble detector, and subsequently receives from said external device via said communication unit when a change in the power source from an OFF condition to an ON condition is detected by said power source condition detector, the image data which had been previously transmitted by said communication unit to said external device.

25. An image forming apparatus as claimed in claim 24, wherein said controller transmits the image data and the power source is turned OFF when a predetermined time has elapsed without operation after detection of the trouble.

26. An image forming apparatus as claimed in claim 24, further comprising:

an image reading apparatus which reads document images;

wherein said memory stores a plurality of jobs, each job including a single document image or a plurality of document images read by the image reading apparatus.

27. An image forming apparatus as claimed in claim 24, further comprising:

determination means for determining the presence/absence of an external device to which the image data can be transmitted from the image forming apparatus; and warning means for warning when said determination means determines the absence of the external device.

28. An image forming apparatus as claimed in claim 24, said controller including:

a detector for detecting an available memory storage capacity and the amount of the transmitted image data;

wherein said controller receives the transmitted image data when the available memory storage capacity is more than the amount of the transmitted image data.

29. An image forming apparatus as claimed in claim 24, wherein said memory stores a plurality of jobs, and said controller transmits image data of a plurality of jobs.

* * * * *